(12) United States Patent
Zhou

(10) Patent No.: US 11,564,080 B2
(45) Date of Patent: Jan. 24, 2023

(54) METHOD, APPARATUS, AND SYSTEM FOR SENDING TERMINAL POLICY

(71) Applicant: HUAWEI TECHNOLOGIES CO., LTD., Guangdong (CN)

(72) Inventor: Xiaoyun Zhou, Nanjing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 120 days.

(21) Appl. No.: 17/158,515

(22) Filed: Jan. 26, 2021

(65) Prior Publication Data

US 2021/0153002 A1    May 20, 2021

Related U.S. Application Data

(63) Continuation of application No. PCT/CN2020/092614, filed on May 27, 2020.

(30) Foreign Application Priority Data

Jun. 4, 2019    (CN) .......................... 201910483077.1

(51) Int. Cl.
*H04W 8/08* (2009.01)
*H04W 76/11* (2018.01)
*H04W 48/18* (2009.01)
*H04W 60/04* (2009.01)

(52) U.S. Cl.
CPC ............. *H04W 8/08* (2013.01); *H04W 48/18* (2013.01); *H04W 60/04* (2013.01); *H04W 76/11* (2018.02)

(58) Field of Classification Search
CPC ....... H04W 8/08; H04W 48/18; H04W 76/11; H04W 72/0493; H04W 72/1257;
(Continued)

(56) References Cited

U.S. PATENT DOCUMENTS

2010/0291923 A1* 11/2010 Zhou et al. ................. 455/432.1
2012/0102174 A1*  4/2012 Zhou et al. .................... 709/223
(Continued)

FOREIGN PATENT DOCUMENTS

CN           101459904 A  *  6/2009  ......... H04L 63/0892
CN    WO 2009086759 A1  *  7/2009  ............ H04M 15/00
(Continued)

OTHER PUBLICATIONS

Huawei, "Correction to UE policy provisioning," 3GPP TSG-CT WG3 Meeting #102, C3-191130, Xi'an, China, Apr. 8-12, 2019, 4 pages.
(Continued)

*Primary Examiner* — Meless N Zewdu
(74) *Attorney, Agent, or Firm* — Fish & Richardson P.C.

(57) ABSTRACT

This application provides a method, an apparatus, and a system for sending a terminal policy. After determining that a terminal is not reachable, a mobility management network element may send, to a visited policy control function network element, a notification indicating that a first message fails to be forwarded. The visited policy control function network element may determine, based on the notification, a first PTI allocated by a home policy control function network element to a first policy, and send, to the home policy control function network element, both the first PTI and the indication indicating that the first message fails to be forwarded, to notify the home policy control function network element.

21 Claims, 8 Drawing Sheets

(58) Field of Classification Search
CPC ......... H04W 8/00; H04W 8/02; H04W 8/082; H04W 8/087; H04W 8/18; H04W 8/24; H04W 76/00; H04W 76/10; H04W 76/18; H04W 88/18; H04W 88/00; H04W 8/06; H04W 60/04; H04W 8/12; H04W 8/205; H04W 48/08; H04W 8/14; H04W 8/16; H04W 48/16; H04W 48/00; H04W 48/02; H04L 12/14; H04L 12/1407; H04L 41/0894

See application file for complete search history.

(56) References Cited

U.S. PATENT DOCUMENTS

| | | | | |
|---|---|---|---|---|
| 2019/0053147 | A1* | 2/2019 | Qiao et al. | ............ H04W 48/18 |
| 2019/0159227 | A1* | 5/2019 | Talebi Fard et al. | ........................ H04W 72/1263 |

FOREIGN PATENT DOCUMENTS

| | | | |
|---|---|---|---|
| CN | 102131175 B | * | 8/2013 |
| CN | 108684073 A | | 10/2018 |
| CN | 109756423 A | | 5/2019 |
| WO | 2018157939 A1 | | 9/2018 |

OTHER PUBLICATIONS

Office Action issued in Chinese Application No. 201910483077.1 dated Mar. 19, 2021, 19 pages (with English translation).

Huawei, HiSilicon, "Service based procedures on Policy Control," SA WG2 Meeting #118bis, S2-170123, Spokane, UA, Jan. 16-20, 2017, 10 pages.

3GPP TS 29.525 V15.1 0 (Mar. 2019), "3rd Generation Partnership Project;Technical Specification Group Core Network and Terminals;5G System; UE Policy Control Service;Stage 3(Release 15)," Mar. 2019, 42 pages.

3GPP TS 29.518 V15.3 0 (Mar. 2019), "3rd Generation Partnership Project;Technical Specification Group Core Network and Terminals;5G System; Access and Mobility Management Services; Stage 3(Release 15)," Mar. 2019, 195 pages.

3GPP TS 24.501 V15.3.0 (Mar. 2019), "3rd Generation Partnership Project;Technical Specification Group Core Network and Terminals; Non-Access-Stratum (NAS) protocol for 5G System (5GS);Stage 3(Release 15)," Mar. 2019, 470 pages.

PCT International Search Report and Written Opinion issued in International Application No. PCT/CN2020/092614 dated Aug. 21, 2020, 11 pages (with English translation).

CT3, "[Draft] LS on PTI handling in UE policy delivery service," 3GPP TSG CT WG1 Meeting #116, C1-192037, Xi'an, China, Apr. 8-12, 2019, 2 pages.

Extended European Search Report issued in European Application No. 20818322.8 dated Oct. 18, 2021, 13 pages.

Huawei, "Discussion on the UE policy distribution," 3GPP TSG-CT WG3 Meeting #101, C3-190154, Montreal, USA, Feb. 25-Mar. 1, 2019, 2 pages.

Huawei, "Resending the UE policy," 3GPP TSG-CT WG3 Meeting #102, C3-191386, Xi'an, China, Apr. 8-12, 2019, 4 pages.

Nokia et al., "Clarifications on use of PCF-provided PTI for UE policies delivery," 3GPP TSG CT WG1 Meeting #115, C1-191635, Montreal (Canada), Feb. 25-Mar. 1, 2019, 5 pages.

* cited by examiner

METHOD, APPARATUS, AND SYSTEM FOR SENDING TERMINAL POLICY

CROSS-REFERENCE TO RELATED APPLICATIONS

This application is a continuation of International Application No. PCT/CN2020/092614, filed on May 27, 2020, which claims priority to Chinese Patent Application No. 201910483077.1, filed on Jun. 4, 2019. The disclosures of the aforementioned applications are hereby incorporated by reference in their entireties.

TECHNICAL FIELD

This application relates to the communications field, and more specifically, to a method, an apparatus, and a system for sending a terminal policy.

BACKGROUND

In a 5th generation (5G) system, an access and mobility management function (AMF) may interact with a policy control function (PCF) to obtain a user equipment (UE) policy. The PCF provides the UE policy for a terminal through the AMF. PCFs include a visited policy control function (V-PCF) and a home policy control function (H-PCF).

However, in some scenarios, the AMF cannot send the UE policy to the terminal because the UE is not reachable. A processing method in this case has not been defined in the prior art.

SUMMARY

In view of this, this application provides a method, an apparatus, and a system for sending a terminal policy, to notify a home policy control function network element of a terminal policy that fails to be sent.

According to a first aspect, a method for sending a terminal policy is provided, including: a visited policy control function network element receives, from a mobility management network element, a notification indicating that a first message fails to be forwarded, and may learn that the first message fails to be forwarded, where the first message includes a first policy of a terminal; and then, the visited policy control function network element sends a second message to a home policy control function network element, where the second message includes first indication information and a first procedure transaction identity PTI, the first indication information is used to indicate that a terminal policy fails to be sent, and the first PTI is allocated by the home policy control function network element to the first policy, so that the home policy control function network element also learns that the terminal policy fails to be forwarded, and may suspend providing the terminal policy, thereby helping prevent the home policy control function network element from performing unnecessary sending.

Optionally, the visited policy control function network element may determine the first PTI based on the notification.

In an implementation, the method further includes: the visited policy control function network element sends a first request message to the mobility management network element, where the first request message is used to request the mobility management network element to forward the first message; and correspondingly, that the visited policy control function network element receives, from the mobility management network element, the notification indicating that the first message fails to be forwarded includes: the visited policy control function network element receives a first response message from the mobility management network element, where the notification is the first response message.

Herein, the notification sent by the mobility management network element may be a response to the request of the visited policy control function network element for forwarding the first message.

Optionally, the first message includes a second PTI, and the second PTI is allocated by the visited policy control function network element to the first policy. The method further includes: the visited policy control function network element determines, based on the notification, the second PTI corresponding to the first policy; and the visited policy control function network element determines the first PTI based on the second PTI, where the first PTI corresponds to one or more PTIs, and the second PTI is a PTI in the one or more PTIs. Therefore, in this implementation, the visited policy control function network element may determine a first identifier based on the notification.

In this implementation, the visited policy control function network element may directly determine the second PTI based on the notification. Then, because the visited policy control function network element stores a correspondence between the first PTI and the second PTI, the visited policy control function network element can obtain the first PTI based on the second PTI.

In another implementation, the method further includes: the visited policy control function network element sends a second request message to the mobility management network element, where the second request message is used to request the mobility management network element to forward the first message; the visited policy control function network element receives a second response message from the mobility management network element, where the second response message includes a first identifier, the first identifier is used to identify the first message, and correspondingly, the notification includes the first identifier; and the visited policy control function network element determines, based on the first identifier, the first PTI corresponding to the first policy. Herein, the visited policy control function network element may determine the first identifier based on the first identifier in the notification.

Optionally, after the visited policy control function network element receives the second response message from the mobility management network element, the method further includes: the visited policy control function network element stores a first correspondence between the first identifier and the first PTI. Correspondingly, that the visited policy control function network element determines, based on the first identifier, the first PTI corresponding to the first policy includes: the visited policy control function network element determines the first PTI based on the first correspondence and the first identifier. Therefore, the visited policy control function network element may store the first correspondence between the first identifier and the first PTI, and then obtain the first PTI based on the first identifier and the first correspondence. Optionally, the first message includes a second PTI, and the second PTI is allocated by the visited policy control function network element to the first policy. Correspondingly, that the visited policy control function network element determines, based on the first identifier, the first PTI corresponding to the first policy includes: the visited policy control function network element determines, based on the first identifier, the second PTI corresponding to the first policy; and the visited policy control function network element determines the first PTI based on the second PTI, where the first PTI corresponds to one or more PTIs, and the second PTI is a PTI in the one or more PTIs.

Herein, a difference from the foregoing implementation lies in that the visited policy control function network element determines, based on the first identifier included in the notification, the second PTI corresponding to the first policy. Then, the visited policy control function network element determines the first PTI based on the second PTI.

Optionally, after the visited policy control function network element receives the second response message from the mobility management network element, the method further includes: the visited policy control function network element stores a second correspondence between the first identifier and the second PTI. Correspondingly, that the visited policy control function network element determines, based on the first identifier, the second PTI corresponding to the first policy includes: the visited policy control function network element determines the second PTI based on the second correspondence and the first identifier.

Herein, after receiving the second response message from the mobility management network element, where the second response message includes the first identifier, the visited policy control function network element temporarily cannot determine whether the first policy is successfully forwarded, and may first store the second correspondence between the first identifier and the second PTI. Then, after receiving, from the mobility management network element, the notification indicating that the first message fails to be forwarded, the visited policy control function network element may determine that the first policy fails to be forwarded. The visited policy control function network element may obtain the second PTI based on the second correspondence and the first identifier included in the notification.

Optionally, the notification further includes an identifier list, the identifier list includes a plurality of identifiers, each identifier is used to identify a message that fails to be sent, and the first identifier is one of the plurality of identifiers. Herein, if a plurality of messages fail to be forwarded, the mobility management network element may send one notification including an identifier list, to be specific, identifiers corresponding to the plurality of messages that fail to be forwarded are returned to the visited policy control function network element by using a same notification. Alternatively, the mobility management network element may return a plurality of notifications, and each notification includes a corresponding identifier.

The first policy may be a part or all of the terminal policy. In the foregoing implementations, optionally, the second message further includes a terminal policy section identifier of the first policy.

In the foregoing implementations, optionally, that the visited policy control function network element sends the second message to the home policy control function network element includes: when receiving the first policy retransmitted by the home policy control function network element, the visited policy control function network element sends the second message to the home policy control function network element. In other words, the visited policy control function network element may receive the first policy that is re-sent or retransmitted by the home policy control function network element. The second message may be sent to the home policy control function network element when the re-sent or retransmitted first policy is received.

In the foregoing implementations, optionally, the method further includes: the visited policy control function network element receives second indication information from the mobility management network element, where the second indication information is used to indicate that the terminal is reachable; and the visited policy control function network element sends the second indication information to the home policy control function network element. Therefore, if determining that the terminal is reachable, the mobility management network element may notify the visited policy control function network element. After obtaining a reachability indication, the visited policy control function network element may send the reachability indication to the home policy control function network element, so that the home policy control function network element continues to provide the terminal policy.

Optionally, the method further includes: the visited policy control function network element receives a first subscription message from the home policy control function network element, where the first subscription message is used to subscribe to an event that the terminal is reachable. Correspondingly, that the visited policy control function network element sends the second indication information to the home policy control function network element includes: the visited policy control function network element sends the second indication information to the home policy control function network element based on the first subscription message.

To be specific, the visited policy control function network element may send the second indication information to the home policy control function network element depending on that the home policy control function network element subscribes to the event that the terminal is reachable. Alternatively, the visited policy control function network element may send the second indication information to the home policy control function network element depending on that a failure indication (for example, the second message) has been sent to the home policy control function network element.

Optionally, before the visited policy control function network element receives the second indication information from the mobility management network element, the method further includes: the visited policy control function network element sends a second subscription message to the mobility management network element, where the second subscription message is used to subscribe to an event that the terminal is reachable.

To be specific, the mobility management network element may send the second indication information to the visited policy control function network element depending on that the visited policy control function network element subscribes to the event that the terminal is reachable. Alternatively, the mobility management network element may send the second indication information to the visited policy control function network element depending on that a notification indicating that a message fails to be forwarded has been sent to the visited policy control function network element.

According to a second aspect, a method for sending a terminal policy is provided, including: a home policy control function network element sends a third message to a visited policy control function network element, where the third message includes a first policy of a terminal and a first procedure transaction identity PTI, and the first PTI is allocated by the home policy control function network element to the first policy; and the home policy control function network element receives a second message from the visited policy control function network element, where the second message includes first indication information and the first PTI, and the first indication information is used to indicate that a terminal policy fails to be sent, so that the home policy control function network element learns that the terminal policy fails to be forwarded, and may suspend providing of the terminal policy, thereby helping prevent the home policy control function network element from performing unnecessary sending.

In a possible implementation, the method further includes: the home policy control function network element stops, based on the first indication information, a timer corresponding to the first PTI, where the timer is used by the home policy control function network element to determine to send the first policy. Therefore, after receiving the first indication information, the home policy control function network element may stop the timer corresponding to the first PTI, to avoid unnecessary sending.

In a possible implementation, the method further includes: the home policy control function network element starts a first timer when the home policy control function network element sends the third message to the visited policy control function network element; and after the first timer expires, the home policy control function network element retransmits the third message to the visited policy control function network element if the home policy control function network element does not receive a response message from the visited policy control function network element. Correspondingly, that the home policy control function network element receives the second message from the visited policy control function network element includes: after the home policy control function network element retransmits the third message to the visited policy control function network element, the home policy control function network element receives the second message from the visited policy control function network element. In other words, the second message may be sent to the home policy control function network element when the re-sent or retransmitted first policy is received.

The first policy may be a part or all of the terminal policy. In the foregoing implementations, optionally, the second message further includes a terminal policy section identifier of the first policy.

In the foregoing implementations, optionally, the method further includes: the home policy control function network element receives second indication information from the visited policy control function network element, where the second indication information is used to indicate that the terminal is reachable; and the home policy control function network element sends a response message to the visited policy control function network element, where the response message is used to respond to the second indication information. Therefore, if determining that the terminal is reachable, a mobility management network element may notify the visited policy control function network element. After obtaining a reachability indication, the visited policy control function network element may send the reachability indication to the home policy control function network element, so that the home policy control function network element can continue to provide the terminal policy.

Optionally, the second indication information may be sent to the home policy control function network element after an event that the terminal is reachable is subscribed to, or may be sent to the home policy control function network element after the visited policy control function network element has sent a failure indication (for example, the second message) to the home policy control function network element.

In a possible implementation, the method further includes: the home policy control function network element sends a first subscription message to the visited policy control function network element, where the first subscription message is used to subscribe to an event that the terminal is reachable. Herein, the home policy control function network element may subscribe, in advance, to the event that the terminal is reachable.

According to a third aspect, a system for sending a terminal policy is provided, including a visited policy control function network element and a home policy control function network element. Optionally, the system further includes a mobility management network element.

The visited policy control function network element is configured to: receive, from the mobility management network element, a notification indicating that a first message fails to be forwarded, where the first message includes a first policy of a terminal; send a second message to the home policy control function network element, where the second message includes first indication information and a first procedure transaction identity PTI, the first indication information is used to indicate that a terminal policy fails to be sent, and the first PTI is allocated by the home policy control function network element to the first policy.

The home policy control network element is configured to receive the second message. In this way, the home policy control network element may learn that the terminal policy fails to be forwarded, and may suspend providing of the terminal policy, thereby helping prevent the home policy control function network element from performing unnecessary sending.

Optionally, the home policy control function network element is configured to stop, based on the first indication information, a timer corresponding to the first PTI, where the timer is used by the home policy control function network element to determine to send the first policy.

In a first possible implementation, the visited policy control function network element is further configured to send a first request message to the mobility management network element, where the first request message is used to request the mobility management network element to forward the first message. Correspondingly, that the visited policy control function network element is configured to receive, from the mobility management network element, the notification indicating that the first message fails to be forwarded specifically includes: receiving a first response message from the mobility management network element, where the notification is the first response message.

Optionally, the first message includes a second PTI, and the second PTI is allocated by the visited policy control function network element to the first policy. The visited policy control function network element is further configured to: determine, based on the notification, the second PTI corresponding to the first policy; and determine the first PTI based on the second PTI, where the first PTI corresponds to one or more PTIs, and the second PTI is a PTI in the one or more PTIs.

In a second possible implementation, the visited policy control function network element is further configured to: send a second request message to the mobility management network element, where the second request message is used to request the mobility management network element to forward the first message; receive a second response message from the mobility management network element, where the second response message includes a first identifier, the first identifier is used to identify the first message, and correspondingly, the notification includes the first identifier;

and determine, based on the first identifier, the first PTI corresponding to the first policy.

Optionally, the visited policy control function network element is further configured to store a first correspondence between the first identifier and the first PTI. Correspondingly, that the visited policy control function network element is configured to determine, based on the first identifier, the first PTI corresponding to the first policy specifically includes: determining the first PTI based on the first correspondence and the first identifier. Optionally, the first message includes a second PTI, and the second PTI is allocated by the visited policy control function network element to the first policy. Correspondingly, that the visited policy control function network element is configured to determine, based on the first identifier, the first PTI corresponding to the first policy specifically includes: determining, based on the first identifier, the second PTI corresponding to the first policy; and determining the first PTI based on the second PTI, where the first PTI corresponds to one or more PTIs, and the second PTI is a PTI in the one or more PTIs.

Optionally, the visited policy control function network element is further configured to store a second correspondence between the first identifier and the second PTI. Correspondingly, that the visited policy control function network element is configured to determine, based on the first identifier, the second PTI corresponding to the first policy specifically includes: determining the second PTI based on the second correspondence and the first identifier.

In the foregoing possible implementations, the mobility management network element is configured to send second indication information to the visited policy control function network element, where the second indication information is used to indicate that the terminal is reachable. Correspondingly, the visited policy control function network element is configured to send the second indication information to the home policy control function network element.

Optionally, the visited policy control function network element is further configured to receive a first subscription message from the home policy control function network element, where the first subscription message is used to subscribe to an event that the terminal is reachable. Correspondingly, that the visited policy control function network element is configured to send the second indication information to the home policy control function network element specifically includes:

sending the second indication information to the home policy control function network element based on the first subscription message.

Optionally, the visited policy control function network element is further configured to send a second subscription message to the mobility management network element, where the second subscription message is used to subscribe to an event that the terminal is reachable. Correspondingly, the mobility management network element is further configured to send the second indication information to the visited policy control function network element based on the second subscription message.

According to a fourth aspect, a communications apparatus is provided. The apparatus may be a policy control function network element (which may have both a visited policy control function and a home policy control function), or may be a chip. The apparatus has a function of implementing the visited policy control function network element and the home policy control function network element in any one of the first aspect and the second aspect or the possible implementations of the first aspect and the second aspect. The function may be implemented by hardware, or may be implemented by hardware by executing corresponding software. The hardware or the software includes one or more modules corresponding to the foregoing function.

According to a fifth aspect, a communications apparatus is provided. The apparatus may be a visited policy control function network element, or may be a chip. The apparatus has a function of implementing the visited policy control function network element in any one of the foregoing aspects or the possible implementations of the foregoing aspects. The function may be implemented by hardware, or may be implemented by hardware by executing corresponding software. The hardware or the software includes one or more modules corresponding to the foregoing function.

According to a sixth aspect, a communications apparatus is provided. The apparatus may be a home policy control function network element, or may be a chip. The apparatus has a function of implementing the home policy control function network element in any one of the foregoing aspects or the possible implementations of the foregoing aspects. The function may be implemented by hardware, or may be implemented by hardware by executing corresponding software. The hardware or the software includes one or more modules corresponding to the foregoing function.

According to a seventh aspect, an apparatus is provided. The apparatus includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the apparatus to perform the method of the visited policy control function network element in any one of the foregoing aspects or the possible implementations of the foregoing aspects, or perform the method of the home policy control function network element in any one of the foregoing aspects or the possible implementations of the foregoing aspects.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

According to an eighth aspect, an apparatus is provided. The apparatus includes a processor and a transceiver. The processor is connected to the transceiver. The processor is configured to execute an instruction; and the transceiver is configured to communicate with another network element under control of the processor. When the processor executes the instruction, the execution enables the apparatus to perform the method of the visited policy control function network element in any one of the foregoing aspects or the possible implementations of the foregoing aspects, or perform the method of the home policy control function network element in any one of the foregoing aspects or the possible implementations of the foregoing aspects.

According to a ninth aspect, a computer-readable storage medium is provided. The computer-readable storage medium stores a program, and the program enables a visited policy control function network element to perform the method of the visited policy control function network element in any one of the first aspect and the second aspect or the possible implementations of the first aspect and the second aspect.

According to a tenth aspect, a computer-readable storage medium is provided. The computer-readable storage medium stores a program, and the program enables a home policy control function network element to perform the method of the home policy control function network element in any one of the first aspect and the second aspect or the possible implementations of the first aspect and the second aspect.

According to an eleventh aspect, a communications chip is provided. The communications chip stores an instruction. When the instruction is run on a computer device, the communications chip is enabled to perform the method in any one of the first aspect and the second aspect or the possible implementations of the first aspect and the second aspect.

According to a twelfth aspect, a computer program product including an instruction is provided. When the computer program product runs on a computer, the computer is enabled to perform the method in any one of the first aspect and the second aspect or the possible implementations of the first aspect and the second aspect.

DESCRIPTION OF EMBODIMENTS

The following describes the technical solutions in this application with reference to the accompanying drawings.

The technical solutions in embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Figure 1:
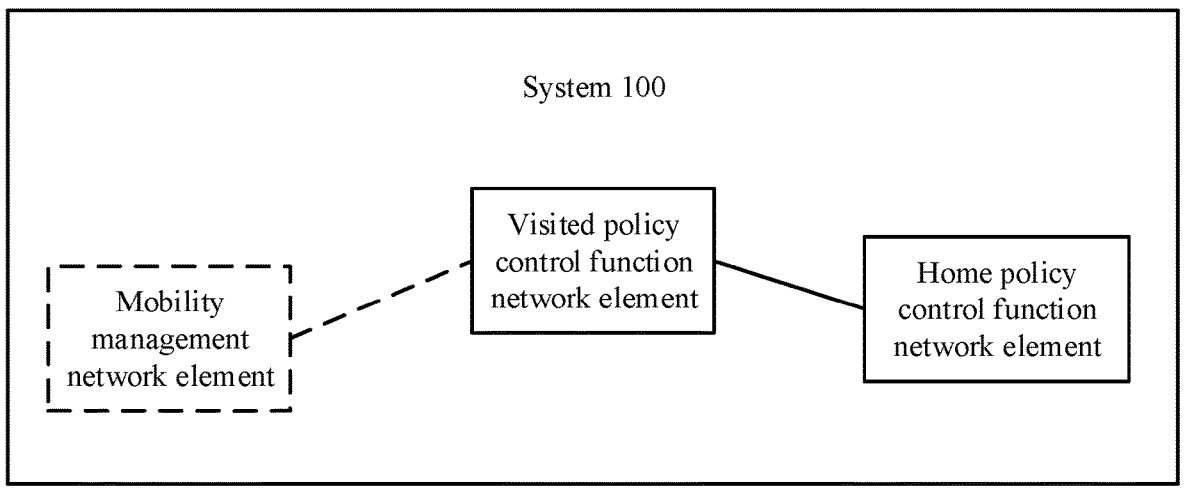
FIG. 1 is a schematic architectural diagram of a system to which embodiments of this application are applied.

FIG. 1 is a schematic architectural diagram of a system to which embodiments of this application are applied. As shown in FIG. 1, the system 100 includes a visited policy control function network element and a home policy control function network element. The system may be configured to perform a method for sending a terminal policy in the embodiments of this application. Optionally, the system 100 further includes a mobility management network element.

The visited policy control function network element is configured to receive, from the mobility management network element, a notification indicating that a first message fails to be forwarded, where the first message includes a first policy of a terminal. The visited policy control function network element is further configured to send a second message to the home policy control function network element, where the second message includes first indication information and a first procedure transaction identity (PTI), the first indication information is used to indicate that a terminal policy fails to be sent, and the first PTI is allocated by the home policy control function network element to the first policy.

The home policy control function network element is configured to receive the second message.

Optionally, the home policy control function network element is configured to stop, based on the first indication information, a timer corresponding to the first PTI, where the timer is used by the home policy control function network element to determine to send the first policy.

In a first possible implementation, the visited policy control function network element is further configured to send a first request message to the mobility management network element, where the first request message is used to request the mobility management network element to forward the first message. Correspondingly, that the visited policy control function network element is configured to receive, from the mobility management network element, the notification indicating that the first message fails to be forwarded specifically includes: receiving a first response message from the mobility management network element, where the notification is the first response message.

Optionally, the first message includes a second PTI, and the second PTI is allocated by the visited policy control function network element to the first policy. The visited policy control function network element is further configured to: determine, based on the notification, the second PTI corresponding to the first policy; and determine the first PTI based on the second PTI, where the first PTI corresponds to one or more PTIs, and the second PTI is a PTI in the one or more PTIs.

In a second possible implementation, the visited policy control function network element is further configured to: send a second request message to the mobility management network element, where the second request message is used to request the mobility management network element to forward the first message; receive a second response message from the mobility management network element, where the second response message includes a first identifier, the first identifier is used to identify the first message, and correspondingly, the notification includes the first identifier; and determine, based on the first identifier, the first PTI corresponding to the first policy.

Optionally, after the visited policy control function network element receives the second response message from the mobility management network element, the visited policy control function network element is further configured to store a first correspondence between the first identifier and the first PTI. Correspondingly, that the visited policy control function network element is configured to determine, based on the first identifier, the first PTI corresponding to the first policy specifically includes: determining the first PTI based on the first correspondence and the first identifier.

Optionally, the first message includes a second PTI, and the second PTI is allocated by the visited policy control function network element to the first policy. Correspondingly, that the visited policy control function network element is configured to determine, based on the first identifier, the first PTI corresponding to the first policy specifically includes: determining, based on the first identifier, the second PTI corresponding to the first policy; and determining the first PTI based on the second PTI, where the first PTI corresponds to one or more PTIs, and the second PTI is a PTI in the one or more PTIs.

Optionally, the visited policy control function network element is further configured to store a second correspondence between the first identifier and the second PTI. Correspondingly, that the visited policy control function network element is configured to determine, based on the first identifier, the second PTI corresponding to the first policy specifically includes: determining the second PTI based on the second correspondence and the first identifier.

In the foregoing possible implementations, the mobility management network element is configured to send second indication information to the visited policy control function network element, where the second indication information is used to indicate that the terminal is reachable. Correspondingly, the visited policy control function network element is configured to send the second indication information to the home policy control function network element.

Optionally, the visited policy control function network element is further configured to receive a first subscription message from the home policy control function network element, where the first subscription message is used to subscribe to an event that the terminal is reachable. Correspondingly, that the visited policy control function network element is configured to send the second indication information to the home policy control function network element specifically includes:

sending the second indication information to the home policy control function network element based on the first subscription message.

Optionally, the visited policy control function network element is further configured to send a second subscription message to the mobility management network element, where the second subscription message is used to subscribe to an event that the terminal is reachable. Correspondingly, the mobility management network element is further configured to send the second indication information to the visited policy control function network element based on the second subscription message.

It should be noted that the visited policy control function network element, the home policy control function network element, the mobility management network element, and the like in FIG. 1 are merely names, and the names constitute no limitation on the devices. In a 5G network and another future network, the visited policy control function network element, the home policy control function network element, and the mobility management network element may also have other names. This is not specifically limited in the embodiments of this application. For example, the visited policy control function network element may alternatively be replaced with a visited policy control function (V-PCF) entity, the home policy control function network element may alternatively be replaced with a home policy control function (H-PCF) entity, and the mobility management network element may alternatively be replaced with an access and mobility management function (AMF) entity. This is uniformly described herein. Details are not described below again.

Optionally, the visited policy control function network element, the home policy control function network element, and the access and mobility management network element in the system 100 may be an independent network element each, or may be jointly implemented by a plurality of network elements, or may be used as a function module in one network element each. This is not specifically limited in the embodiments of this application.

It may be understood that the foregoing functions may be network elements in a hardware device, or may be software functions running on dedicated hardware, or may be virtualization functions instantiated on a platform (for example, a cloud platform).

A terminal in the embodiments of this application may be user equipment (UE), an access terminal, a terminal in V2X communication, a subscriber unit, a subscriber station, a mobile station, a mobile console, a remote station, a remote terminal, a mobile device, a user terminal, a terminal device, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application. The terminal may further include a V2X device, for example, a vehicle or an on-board unit (OBU) in a vehicle.

The terminal in the embodiments of this application is connected to a radio access network (RAN) device in a wireless manner. The radio access network device is connected to a core network device in a wireless or wired manner. The core network device and the radio access network device may be different physical devices independent of each other, or a function of the core network device and a logical function of the radio access network device may be integrated into a same physical device, or a part of functions of the core network device and a part of functions of the radio access network device may be integrated into one physical device. The terminal may be at a fixed location, or may be movable.

The radio access network device is an access device through which UE is connected to the mobile communications system in a wireless manner, and may be a NodeB, an evolved NodeB eNodeB, a gNodeB (gNB) in a 5G mobile communications system, a base station in a future mobile communications system, an access node in a wireless fidelity (Wi-Fi) system, or the like. The radio access network device may alternatively be a radio controller in a cloud radio access network (CRAN) scenario. Alternatively, the access network device may be a relay node, an access point, a vehicle-mounted device, a wearable device, a network device in a future 5G network, a network device in a future evolved PLMN network, or the like. A specific technology and a specific device form that are to be used for the radio access network device are not limited in the embodiments of this application.

For example, the core network device includes a mobility management entity (MME) or a broadcast/multicast service center (BMSC), or may include a corresponding function entity in a 5G system, for example, a core network control plane (CP) or a user plane (UP) network function such as a session management network function (session management NF, SMF) or an access and mobility management function AMF. A core network control plane may also be understood as a core network control plane function (CPF) entity.

Optionally, the system 100 shown in FIG. 1 may be applied to a 5G network and another future possible network. This is not specifically limited in the embodiments of this application.

Figure 2:
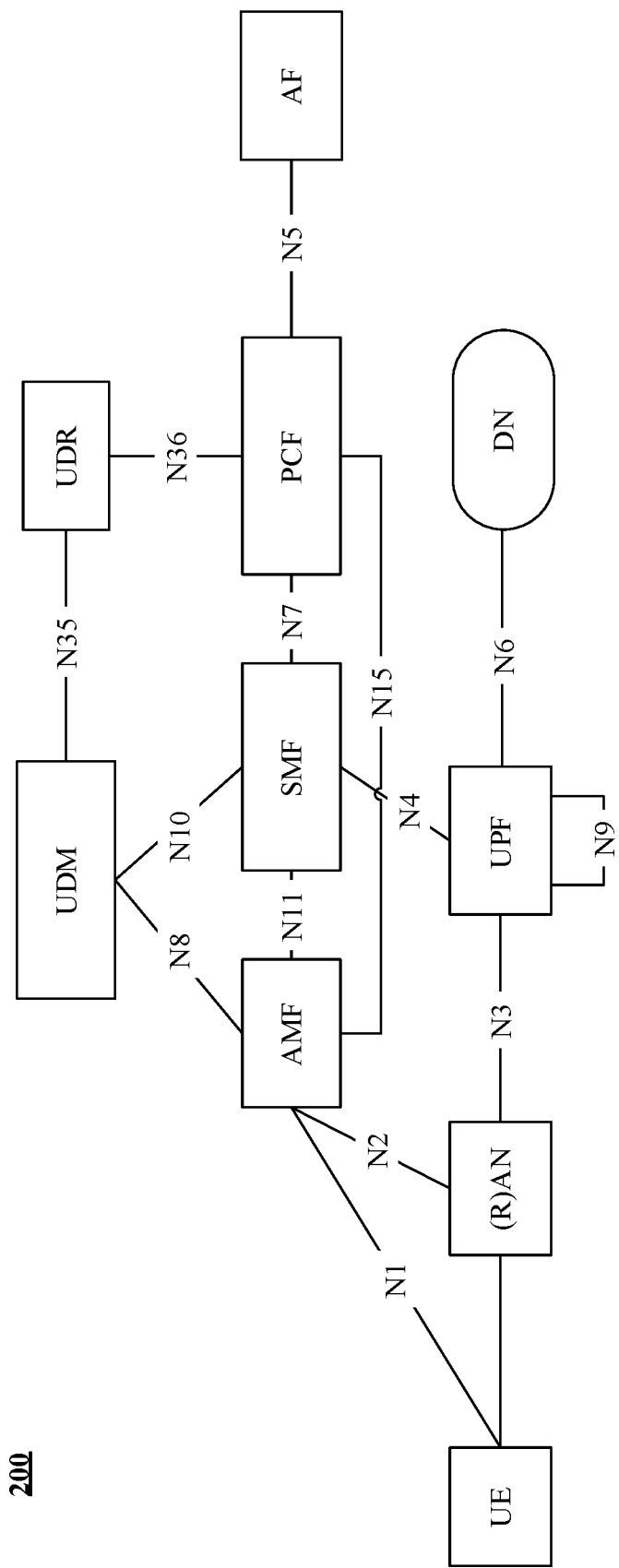
FIG. 2 is a schematic architectural diagram of a 5G system to which this application is applied.

The system 100 shown in FIG. 1 is applied to the 5G network. In this case, as shown in FIG. 2, for example, the foregoing visited policy control function network element and the foregoing home policy control function network element may be a PCF in 5G, that is, the PCF has both a visited policy control function and a home policy control function. Alternatively, as shown in FIG. 3 or FIG. 4, for example, the foregoing visited policy control function network element may be a V-PCF in 5G, the foregoing home policy control function network element may be an H-PCF in 5G, and the foregoing access and mobility management network element may be an AMF in 5G.

Figure 3:
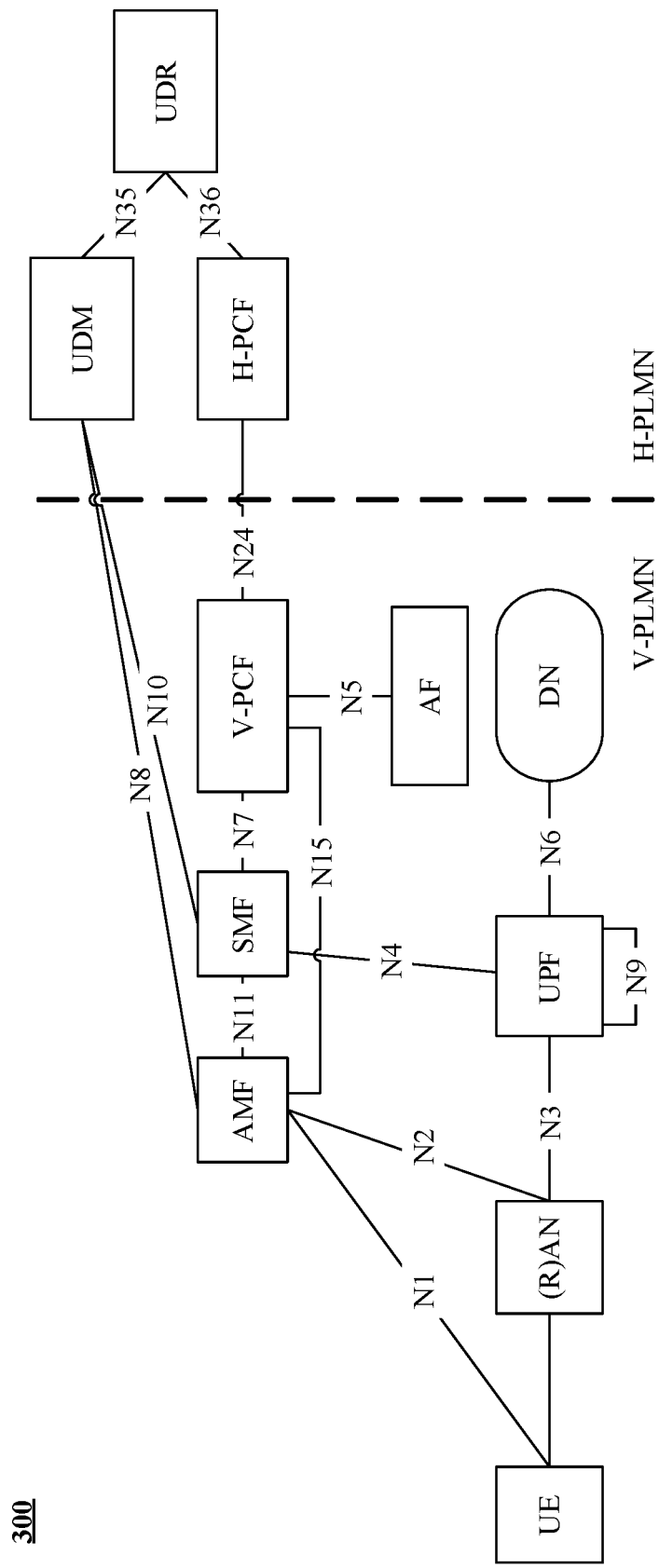
FIG. 3 is a diagram of a local roaming architecture to which embodiments of this application are applied.
Figure 4:
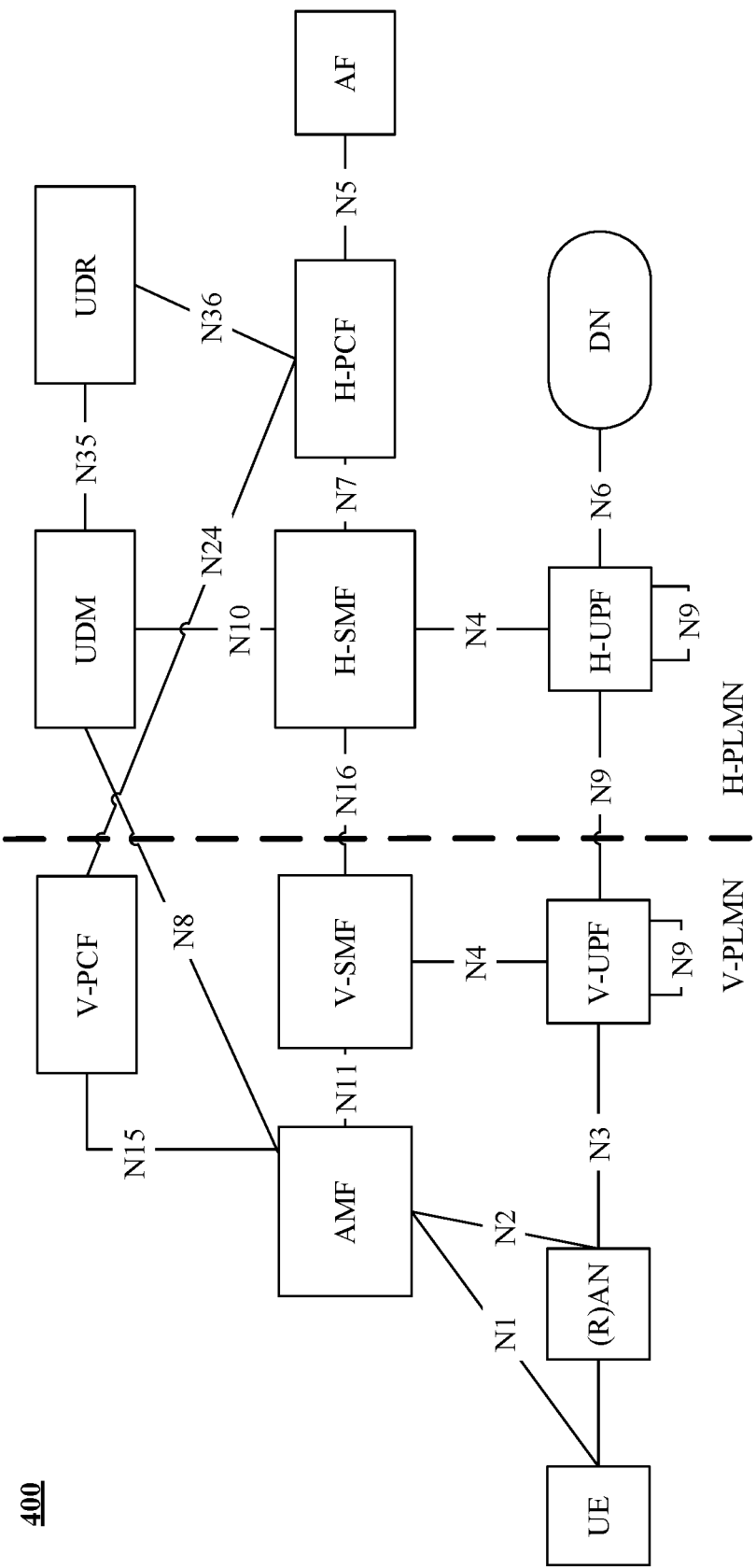
FIG. 4 is a diagram of a home-routed roaming architecture to which embodiments of this application are applied.

The following describes 5G systems in different scenarios with reference to FIG. 2 to FIG. 4. It should be understood that the 5G systems described in this specification are merely examples, and should not constitute any limitation on this application.

FIG. 2 is a basic schematic architectural diagram of a 5G system 200. As shown in FIG. 2, the system 200 includes an access and mobility management function (AMF), a session management function (SMF), a radio access network (RAN), unified data management (UDM), a policy control function (PCF), a data network (DN), a user plane function (UPF), UE, an application function (AF), and a unified data repository (UDR).

Main functions of the network elements are described as follows:

AF: The application function is mainly configured to transfer a requirement of an application side for a network side, for example, a quality of service (QoS) requirement. The AF may be a third-party function entity, or may be an application service deployed by an operator, for example, an IP multimedia subsystem (IMS) voice call service.

UDM: The unified data management is mainly responsible for functions such as subscription data management and user access authorization.

UDR: The unified data repository is mainly responsible for an access function of subscription data, policy data, application data, and other types of data.

PCF: The policy control function is mainly responsible for policy control functions such as session-level and service flow-level charging, a QoS bandwidth guarantee, mobility management, and a UE policy decision. In the system, PCFs connected to the AMF and the SMF are respectively a PCF for access and mobility control (AM PCF) and a PCF for session management (SM PCF). In actual deployment, the AM PCF and the SM PCF may not be a same PCF entity.

SMF: The session management function mainly performs functions such as session management, execution of a control policy delivered by the PCF, UPF selection, and UE IP address allocation.

AMF: The access and mobility management function mainly performs functions such as mobility management and access authentication/authorization. In addition, the AMF is also responsible for transferring a user policy between the UE and the PCF.

UPF: The user plane function serves as an interface UPF of the data network, and implements functions such as user plane data forwarding, charging statistics based on a session/flow level, and bandwidth throttling.

(R)AN: A (radio) access network refers to various access networks in 5G, and there are a plurality of access manners such as wired access and wireless base station access.

PDU session: A PDU session is a session service for implementing PDU connectivity between the UE and the data network, and may be identified by a PDU session ID.

Functions of interfaces are described as follows:

N7 is an interface between the PCF and the SMF and is used to deliver PDU session granularity and service data flow granularity control policies.

N15 is an interface between the PCF and the AMF and is used to deliver a UE policy and an access control related policy.

N5 is an interface between the AF and the PCF and is used to deliver an application service request and report a network event.

N4 is an interface between the SMF and the UPF and is used to transfer information between a control plane and a user plane, including delivery of a forwarding rule from the control plane to the user plane, a QoS control rule, and a traffic statistics rule, and reporting of user plane information.

N11 is an interface between the SMF and the AMF and is used to transfer PDU session tunnel information between the RAN and the UPF, transfer a control message to be sent to the UE, transfer radio resource control information to be sent to the RAN, and so on.

N2 is an interface between the AMF and the RAN and is used to transfer radio bearer control information from a core network side to the RAN and so on.

N1 is an interface between the AMF and the UE, is unrelated to an access manner of the UE, and is used to transfer a QoS control rule to the UE and so on.

N8 is an interface between the AMF and the UDM and is used by the AMF to obtain access and mobility management related subscription data and authentication data from the UDM, register current mobility management related information of the UE with the UDM, and so on.

N10 is an interface between the SMF and the UDM and is used by the SMF to obtain session management related subscription data from the UDM, register current session related information of the UE with the UDM, and so on.

N35 is an interface between the UDM and the UDR and is used by the UDM to obtain user subscription data information from the UDR.

N36 is an interface between the PCF and the UDR and is used by the PCF to obtain policy related subscription data and application data related information from the UDR.

N3 is an interface between the RAN and the UPF and is used to transfer user plane data between the RAN and the UPF.

N6 is an interface between the UPF and the DN and is used to transfer user plane data between the UPF and the DN.

N9 is an interface between UPFs, for example, an interface between a visited policy control function (V-PCF) and a home policy control function (H-PCF), or an interface between a UPF connected to the DN and a UPF connected to the RAN, and is used to transfer user plane data between the UPFs.

A 3rd generation partner project (3GPP) standard defines two roaming modes for user access at a visited location, namely, local breakout roaming and home-routed roaming, which respectively correspond to a system shown in FIG. 3 and a system shown in FIG. 4.

FIG. 3 is a schematic architectural diagram of a 5G system 300 for local breakout roaming. As shown in FIG. 3, the 5G system 300 includes: an AMF, an SMF, a (R)AN, a UDM, a visited policy control function (V-PCF), a home policy control function (H-PCF), a DN, a UPF, a UE, an AF, and a UDR. An interface between the V-PCF and the H-PCF is N24. It should be understood that, in FIG. 3, the UDM, the UDR, and the H-PCF are located on a home public land mobile network (H-PLMN) side, and all other network elements are located on a visited public land mobile network (V-PLMN) side.

Referring to FIG. 3, in the roaming architecture, both the AMF and the SMF are located at a visited location. In this case, a session management function is performed by an SMF function entity at the visited location. In addition, a V-PCF connected to the AMF and a V-PCF connected to the SMF respectively correspond to an AM PCF and an SM PCF. The AM PCF and the SM PCF may not be a same PCF entity in an actual scenario. A user route selection policy in this application may be provided by the H-PCF in the architecture.

FIG. 4 is a schematic architectural diagram of a 5G system 400 for home-routed roaming. A difference between FIG. 4 and FIG. 3 lies in that a home user plane function (H-UPF) and a home session management function (H-SMF) are added to the system 400. In other words, a V-PLMN side and an H-PLMN side each include a UPF and an SMF. The UPF on the V-PLMN side is connected to the UPF on the H-PLMN side through an N9 interface, and the UPF on the H-PLMN side is connected to a DN through an N6 interface. A V-SMF on the V-PLMN side is connected to the H-SMF on the H-PLMN side through an N16 interface, the H-SMF is connected to the UPF on the H-PLMN side through an N4 interface, and the H-SMF is connected to UDM through an N10 interface. The H-PCF is connected to the AF through an N5 interface.

Referring to FIG. 4, in the roaming architecture, the AMF is located at a visited location, and a session management function is performed by the H-SMF. In addition, an H-PCF connected to a V-PCF and an H-PCF connected to the H-SMF respectively correspond to an AM PCF and an SM PCF in this application. The AM PCF and the SM PCF may not be a same PCF entity, or may be a same PCF entity in an actual scenario. A user route selection policy in this application may be provided by the H-PCF in the architecture.

It should be understood that the SM PCF is a policy control function entity connected to the SMF, and is responsible for performing a session management policy rule decision function. The AM PCF is a policy control function entity directly connected to the AMF, and is responsible for performing a policy rule decision function for an access control policy and a UE policy.

It should be noted that names of the network elements (such as the V-PCF, the H-PCF, and the AMF) included in FIG. 2, FIG. 3, or FIG. 4 are merely names, and the names constitute no limitation on functions of the network elements. In a 5G network and another future network, the foregoing network elements may alternatively have other names. This is not specifically limited in the embodiments of this application. For example, in a 6G network, some or all of the foregoing network elements may still use terms in 5G, or may use other names, and so on. This is uniformly described herein. Details are not described below again.

It should further be noted that communication between the network elements of the control plane function in FIG. 2 to FIG. 4 is described by using a non-service-oriented interface as an example, which constitutes no limitation on the protection scope of the embodiments of this application. A person skilled in the art may understand that the network elements of the control plane function in FIG. 2 to FIG. 4 may alternatively communicate with each other through a service-oriented interface. For example, a service-oriented interface provided by the AMF for the outside may be Namf, a service-oriented interface provided by the SMF for the outside may be Nsmf, a service-oriented interface provided by the UDM for the outside may be Nudm, a service-oriented interface provided by the AF for the outside may be Naf, a service-oriented interface provided by the PCF for the outside may be Npcf, and so on.

A person skilled in the art may understand that the network elements in FIG. 2 to FIG. 4 are merely examples for description, and actually, another network element that interacts with the network elements shown in the figure may further be included. Details are not described herein.

For specific working processes and beneficial effects of the network elements in the systems in FIG. 1 to FIG. 4, refer to descriptions in the following method embodiments.

Figure 5:
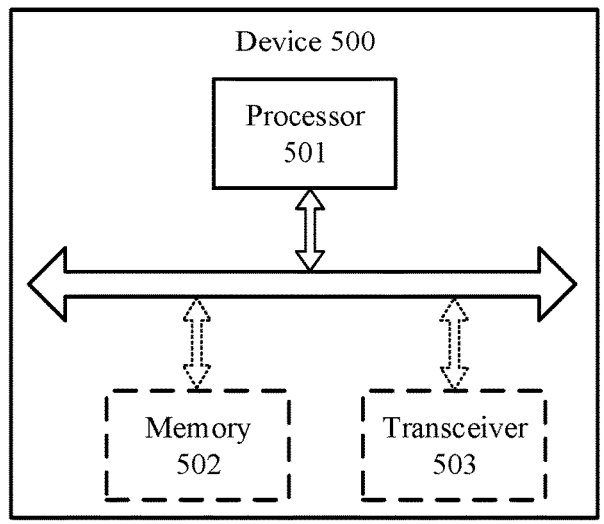
FIG. 5 is a schematic block diagram of a computer device to which embodiments of this application are applied.

FIG. 5 is a schematic block diagram of a computer device 500 (or an apparatus for sending a terminal policy) to which embodiments of this application are applied. The visited policy control function network element and the home policy control function network element in FIG. 1 may be implemented in a form of the computer device in FIG. 5. Alternatively, the PCF in FIG. 2, or the V-PCF or the H-PCF in FIG. 3, or the V-PCF or the H-PCF in FIG. 4 may be implemented in a form of the computer device in FIG. 5. Alternatively, the mobility management network element in FIG. 1 may be implemented in a form of the computer device in FIG. 5. Alternatively, the AMF in FIG. 2, the AMF in FIG. 3, or the AMF in FIG. 4 may be implemented in a form of the computer device in FIG. 5.

It should be understood that the computer device may be a physical device, or may be a component (for example, an integrated circuit or a chip) in a physical device, or may be a function module in a physical device.

As shown in FIG. 5, the computer device includes one or more processors 501. The processor 501 may store an execution instruction used to perform methods in the embodiments of this application. Optionally, the processor 501 may invoke an interface to implement receiving and sending functions. The interface may be a logical interface or a physical interface. This is not limited. For example, the interface may be a transceiver circuit or an interface circuit. The transceiver circuit configured to implement the receiving and sending functions and the interface circuit configured to implement the receiving and sending functions may be separated, or may be integrated together. The transceiver circuit or the interface circuit may be configured to read and write code/data, or the transceiver circuit or the interface circuit may be configured to transmit or transfer a signal.

Optionally, the interface may be implemented by using a transceiver. Optionally, the computer device 500 may further include a transceiver 503. The transceiver 503 may be referred to as a transceiver unit, a transceiver machine, a transceiver circuit, a transceiver, or the like, and is configured to implement the receiving and sending functions.

Optionally, the computer device may further include a memory 502. A specific deployment location of the memory 502 is not specifically limited in this embodiment of this application. The memory may be integrated into the processor, or may be independent of the processor. When the computer device does not include a memory, the computer device only needs to have a processing function, and the memory may be deployed at another location (for example, a cloud system).

The processor 501, the memory 502, and the transceiver 503 communicate with each other through an internal connection path, to transfer a control and/or data signal.

It may be understood that, although not shown, the computer device 500 may further include another apparatus, such as an input apparatus, an output apparatus, or a battery.

Optionally, in some embodiments, the memory 502 may store an execution instruction used to perform the methods in the embodiments of this application. The processor 501 may execute the instruction stored in the memory 502, to complete, in combination with other hardware (for example, the transceiver 503), steps to be performed in the following methods. For a specific working process and beneficial effects, refer to descriptions in the following method embodiments.

The methods disclosed in the embodiments of this application may be applied to the processor 501 or may be implemented by the processor 501. The processor 501 may be an integrated circuit chip and has a signal processing capability. In an implementation process, steps of the methods may be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory (random access memory, RAM), a flash memory, a read-only memory (ROM), a programmable read-only memory, an electrically erasable programmable memory, a register, or the like. The storage medium is located in the memory, and the processor reads instructions in the memory and completes the steps in the foregoing methods in combination with hardware of the processor.

It may be understood that the memory 502 may be a volatile memory or a nonvolatile memory, or may include a volatile memory and a nonvolatile memory. The nonvolatile memory may be a read-only memory ROM, a programmable read-only memory (PROM), an erasable programmable read-only memory (EPROM), an electrically erasable programmable read-only memory (EEPROM), or a flash memory. The volatile memory may be a random access memory RAM, and is used as an external cache. Through example but not limitative description, many forms of RAMs may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these memories and memories of any other proper types.

The computer device 500 may be a general-purpose computer device or a special-purpose computer device. In a specific implementation, the computer device 500 may be a desktop computer, a portable computer, a network server, a palmtop computer (PDA), a mobile phone, a tablet computer, a wireless terminal device, a communications device, an embedded device, or a device having a structure similar to that in FIG. 5. A type of the computer device 500 is not limited in this embodiment of this application.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may learn that with the evolution of the network architecture and the emergence of new service scenarios, the technical solutions provided in the embodiments of this application are also applicable to similar technical problems.

To make a person skilled in the art better understand this application, the following describes, with reference to the 5G system described in this specification, a method for sending a terminal policy provided in this application by using an example.

Figure 6:
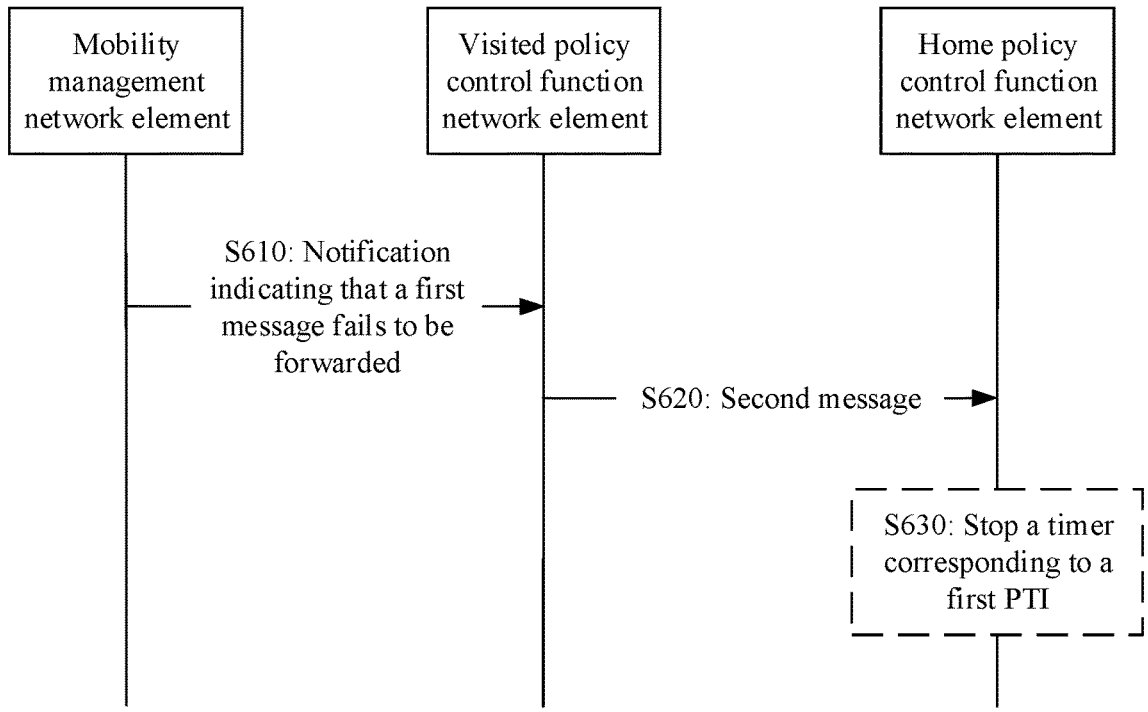
FIG. 6 is a schematic flowchart of a method for sending a terminal policy according to an embodiment of this application.

FIG. 6 is a schematic flowchart of a method 600 for sending a terminal policy according to an embodiment of this application. It should be understood that receiving and sending content in an interaction procedure in FIG. 6 may be received and sent through a message in an existing standard. For a specific meaning of the message, refer to a description in the standard. Alternatively, the receiving and sending content may be received and sent through a newly defined message. This is not limited. As shown in FIG. 6, the method 600 includes the following steps.

S610: A mobility management network element sends, to a visited policy control function network element, a notification indicating that a first message fails to be forwarded, where the first message includes a first policy of a terminal. Correspondingly, the visited policy control function network element receives, from the mobility management network element, the notification indicating that the first message fails to be forwarded.

The first policy may be a part or all of a terminal policy.

Optionally, after the visited policy control function network element receives the terminal policy provided by a home policy control function network element, if a size of the terminal policy is excessively large and exceeds a size pre-configured by a VPLMN, the visited policy control function network element may encapsulate the terminal policy into a plurality of messages (for example, the message may be a MANAGE UE POLICY COMMAND), send the terminal policy to the mobility management network element through a plurality of request messages (for example, the request message is an Namf_Commmuncation_N1N2MessageTransfer Request), and allocate a PTI to a policy encapsulated into each message. To be specific, the terminal policy provided by the home policy control function network element may correspond to one or more PTIs allocated by the visited policy control function network element. For example, the visited policy control function network element encapsulates the first policy of the terminal into the first message, encapsulates the first message into the request message, and then sends the request message to the mobility management network element, to request the mobility management network element to forward the first message. If the mobility management network element finds that the terminal is not reachable, and the mobility management network element cannot forward the first message to the terminal, the mobility management network element may send, to the visited policy control function network element, the notification indicating that the first message fails to be forwarded. Herein, the notification may be used to notify the visited policy control function network element that the first message fails to be forwarded. That the terminal is reachable means that the terminal can be paged or the terminal is in a connected mode.

The terminal policy (which may also be referred to as a UE policy) may also be referred to as a UE access selection and PDU session selection related policy (UE access selection and PDU session selection related policy). The terminal policy may include an access network discovery and selection policy (ANDSP) or a UE route selection policy (URSP). The ANDSP is used by UE to select a non-3GPP access network. The URSP is used by the UE to determine how to route data, that is, determine a PDU session to be used to send data or determine to offload data from the non-3GPP access network. The terminal policy may be a to-be-updated terminal policy, or may be a newly formulated terminal policy. This is not limited.

Before receiving, from the mobility management network element, the notification indicating that the first message fails to be forwarded, the visited policy control function network element may receive the terminal policy provided by the home policy control function network element, to forward the terminal policy to the mobility management network element.

Optionally, before S610, the home policy control function network element sends a third message to the visited policy control function network element, where the third message includes the first policy of the terminal and a first procedure transaction identity PTI, and the first PTI is allocated by the home policy control function network element to the first policy. Correspondingly, the visited policy control function network element receives the third message from the home policy control function network element.

S620: The visited policy control function network element sends a second message to the home policy control function network element, where the second message includes first indication information and the first PTI, the first indication information is used to indicate that the terminal policy fails to be sent, and the first PTI is allocated by the home policy control function network element to the first policy. Correspondingly, the home policy control function network element receives the second message from the visited policy control function network element.

In this embodiment of this application, after determining that the terminal is not reachable, the mobility management network element may send, to the visited policy control function network element, the notification indicating that the first message fails to be forwarded. The visited policy control function network element may determine, based on the notification, the first PTI allocated by the home policy control function network element to the first policy, and send a failure indication and the first PTI to the home policy control function network element, to notify the home policy control function network element. This can effectively prevent the home policy control function network element from performing an unnecessary sending.

After receiving the second message, the home policy control function network element may learn that the first policy corresponding to the first PTI fails to be forwarded. Herein, the first policy may be a part or all of the terminal policy corresponding to the first PTI. Optionally, if the first policy is a part of the terminal policy corresponding to the first PTI, the second message may further include a terminal policy section identifier of the first policy, for example, a UE policy section identifier (UPSI) list corresponding to the first policy.

Optionally, the method 600 further includes S630: The home policy control function network element stops, based on the first indication information, a timer corresponding to the first PTI, where the timer is used by the home policy control function network element to determine to send the first policy.

In other words, when learning that the first policy fails to be forwarded, the home policy control function network element may stop the timer corresponding to the first PTI, that is, stop sending the terminal policy. This helps reduce overheads. The timer corresponding to the first PTI is used to indicate the home policy control function network element to send the first policy.

In this embodiment of this application, before S620, the visited policy control function network element may determine, based on the notification, the first procedure transaction identity PTI corresponding to the first policy. The notification may include a first identifier used to identify the first message, or may not include the first identifier. This is not limited. The first identifier is a transfer ID allocated by the mobility management network element. The first identifier may be understood as a resource uniform resource identifier (URI) for storing an N1/N2 message forwarding state. For example, the first identifier may be {apiRoot}/namf-comm/v1/ue-contexts/{ueContextId}/n1-n2-messages/{n1N2MessageId}.

Herein, after the visited policy control function network element receives the notification, if the notification does not include the first identifier, the visited policy control function network element may determine, based on the notification, the first PTI corresponding to the first policy; or if the notification includes the first identifier, the visited policy control function network element determines, based on the first identifier, the first PTI corresponding to the first policy.

The following separately describes specific implementations of whether the notification includes the first identifier.

In a first implementation, the notification may not include the first identifier. The visited policy control function network element may directly determine, based on the notification indicating that the first message fails to be forwarded, a second PTI corresponding to the first policy.

Optionally, the method 600 further includes: the visited policy control function network element sends a first request message to the mobility management network element, where the first request message is used to request the mobility management network element to forward the first message. Correspondingly, the mobility management network element receives the first request message from the visited policy control function network element. Correspondingly, S610 includes: The mobility management network element sends a first response message to the visited policy control function network element, where the notification is the first response message. Correspondingly, the visited policy control function network element receives the first response message from the mobility management network element.

For example, the visited policy control function network element encapsulates the first policy into the first message, and then sends, to the mobility management network element, a request used to forward the first message, for example, the first request message. If detecting that the terminal is not reachable, the mobility management network element returns a response, for example, the first response message, to the visited policy control network element, to notify the visited policy control function network element that the first message fails to be forwarded.

The first request message or the first response message may be a message sent through a service-oriented interface (for example, an N-amf interface) or a non-service-oriented interface (for example, N15). For example, the first request message is an Namf_Commmuncation_N1N2MessageTransfer Request. For another example, the first response message is an Namf_Commmuncation_N1N2MessageTransfer Response.

Optionally, the method 600 further includes: the visited policy control function network element determines, based on the notification, the second PTI corresponding to the first policy; and the visited policy control function network element determines the first PTI based on the second PTI, where the first PTI corresponds to one or more PTIs, and the second PTI is a PTI in the one or more PTIs.

Herein, after receiving the notification, the visited policy control function network element may learn of a policy that fails to be sent. This is because when the visited policy control function network element requests the mobility management network element to forward the first message, the first message may include the second PTI, and the second PTI is allocated to the first policy of the terminal when the visited policy control function network element receives the terminal policy provided by the home policy control function network element. In this way, after requesting the mobility management network element to forward the first message, if receiving the notification, the visited policy control function network element may directly determine the second PTI corresponding to the first policy. In addition, the visited policy control function network element may encapsulate the terminal policy into a plurality of first messages, one first PTI may correspond to a plurality of PTIs, and the visited policy control function network element stores a correspondence between the first PTI and the one or more PTIs. Therefore, the visited policy control function network element can determine the corresponding first PTI based on the second PTI.

For example, it is assumed that the home policy control function network element allocates a PTI 1 to the terminal policy, and provides the terminal policy for the visited policy control function network element, and the visited policy control function network element encapsulates the terminal policy into two MANAGE UE POLICY COMMANDs, and allocates a PTI, for example, a PTI 2 and a PTI 3, to each MANAGE UE POLICY COMMAND. The visited policy control function network element requests the mobility management network element to forward a first policy corresponding to the PTI 2. After receiving the notification, indicating that the first message fails to be forwarded, returned by the mobility management network element, the visited policy control function network element may determine that the first policy corresponding to the PTI 2 fails to be forwarded, and can determine the corresponding PTI 1 based on the PTI 2, so that the home policy control function network element may be notified that the terminal policy corresponding to the PTI 1 fails to be forwarded.

Figure 7:
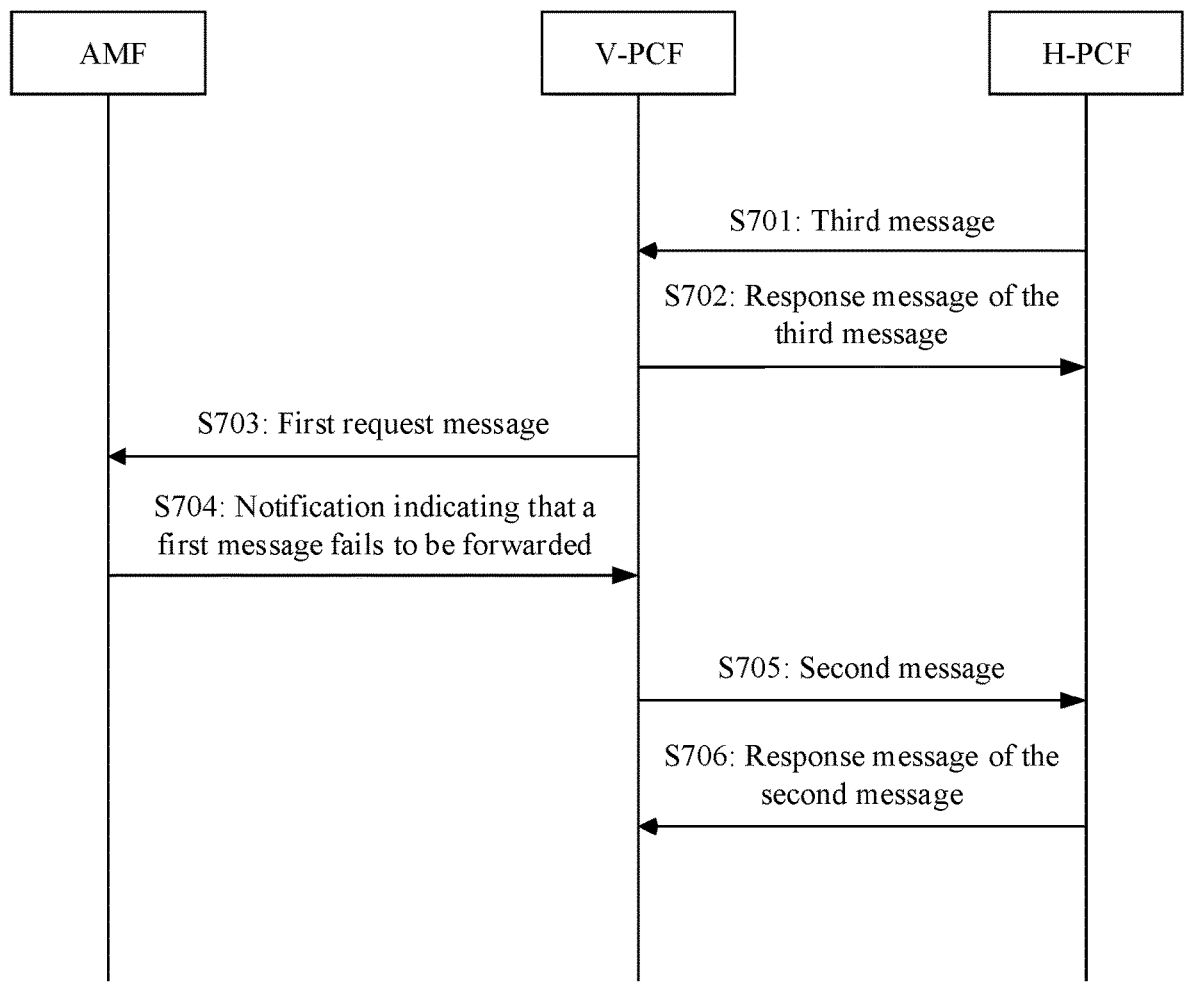
FIG. 7 is a schematic interaction diagram of an example of sending a terminal policy according to an embodiment of this application.

For ease of understanding, description is provided herein with reference to an example in FIG. 7. FIG. 7 is described by using an example in which the home policy control function network element is an H-PCF, the visited policy control function network element is a V-PCF, and the mobility management network element is an AMF. As shown in FIG. 7, the method includes the following steps.

S701: The H-PCF sends a third message to the V-PCF.

For example, the third message may be an Npcf_UEPolicyControl_UpdateNotify Request.

For example, the H-PCF determines to provide a UE policy for a terminal. The H-PCF may encapsulate an updated or newly formulated UE policy in a message format of a MANAGE UE POLICY COMMAND and then send the updated or newly formulated UE policy to the V-PCF through an Npcf_UEPolicyControl_UpdateNotify Request message. The H-PCF may allocate a PTI 1 to the UE policy. Optionally, the H-PCF may start a timer. If the H-PCF does not receive a response message from the UE when the timer expires, the H-PCF re-sends the UE policy. A format of the MANAGE UE POLICY COMMAND is shown in Table 1.

TABLE 1

| Information element (Information Element) | Type/Reference | Presence | Format | Length |
|---|---|---|---|---|
| PTI | Procedure transaction identity | M | V | 1 |
| MANAGE UE POLICY COMMAND message identity | UE policy delivery service message type | M | V | 1 |
| UE policy section management list | UE policy section management list | M | LV-E | 3-65538 |

For specific explanations of content in Table 1, refer to descriptions in an existing standard protocol (3GPP TS 24.501 D.5.1.1). Details are not described herein.

S702: The V-PCF sends a response message of the third message to the H-PCF.

For example, the response message of the third message is an Npcf_UEPolicyControl_UpdateNotify Response.

S703: The V-PCF sends a first request message to the AMF. The first request message is used to request to forward a first message.

For example, the first request message is an Namf_Commmuncation_N1N2MessageTransfer Request, and the first message is a MANAGE UE POLICY COMMAND.

The V-PCF allocates a PTI 2 to the UE policy, replaces the PTI 1 in the MANAGE UE POLICY COMMAND with the PTI 2, and then sends the MANAGE UE POLICY COMMAND to the AMF through the Namf_Commmuncation_N1N2MessageTransfer Request.

The V-PCF may store a correspondence between the PTI 1 and the PTI 2.

Herein, if a size of the UE policy exceeds a size predefined by a VPLMN, the V-PCF encapsulates the UE policy provided by the H-PCF into a plurality of MANAGE UE POLICY COMMANDs, and sends the plurality of MANAGE UE POLICY COMMANDs to the AMF through a plurality of Namf_Commmuncation_N1N2MessageTransfer Requests.

For example, if the V-PCF sends, by encapsulating two MANAGE UE POLICY COMMANDs, the UE policy provided by the H-PCF, the V-PCF may allocate the PTI 2 and a PTI 3 to the two MANAGE UE POLICY COMMANDs. Each MANAGE UE POLICY COMMAND is sent to the AMF through one Namf_Commmuncation_N1N2MessageTransfer Request.

In other words, a first policy of the terminal may be encapsulated into one MANAGE UE POLICY COMMAND and sent to the AMF through one Namf_Commmuncation_N1N2MessageTransfer Request.

5704: The AMF returns, to the V-PCF, a notification indicating that the first message fails to be forwarded.

If determining that the UE is not reachable, the AMF sends, to the V-PCF, the notification indicating that the first message fails to be forwarded. For example, the notification may be an Namf_Commmuncation_N1N2MessageTransfer Response. The V-PCF may learn, based on the Namf_Commmuncation_N1N2MessageTransfer Response, that the policy in the MANAGE UE POLICY COMMAND fails to be forwarded, and may learn that the MANAGE UE POLICY COMMAND corresponds to the PTI 2. Because the correspondence between the PTI 2 and the PTI 1 is stored in S703, the V-PCF may learn of the corresponding PTI 1.

5705: The V-PCF sends a second message to the H-PCF.

For example, the second message is an Npcf_UEPolicyUpdate_Request, and the Npcf_UEPolicyUpdate_Request includes a failure indication and the PTI 1.

5706: The H-PCF returns a response message of the second message to the V-PCF.

For example, the response message of the second message is an Npcf_UEPolicyControl_UpdateNotify Response. The H-PCF may stop the timer corresponding to the PTI 1, and sends the UE policy only after the UE is reachable.

Therefore, in the first implementation, the visited policy control function network element may directly determine, based on the notification indicating that the first message fails to be forwarded, a second PTI corresponding to the first policy.

In a second implementation, the notification may include the first identifier. In other words, the notification sent by the mobility management network element to the visited policy control function network element carries the first identifier corresponding to the first message that fails to be sent. The visited policy control function network element may determine, based on the first identifier carried in the notification indicating that the first message fails to be forwarded, the second PTI corresponding to the first policy.

Optionally, the method 600 further includes: the visited policy control function network element sends a second request message to the mobility management network element, where the second request message is used to request the mobility management network element to forward the first message. Correspondingly, the mobility management network element receives the second request message from the visited policy control function network element.

The mobility management network element sends a second response message to the visited policy control function network element, where the second response message includes the first identifier, and the first identifier is used to identify the first message. Correspondingly, the visited policy control function network element receives the second response message from the mobility management network element. Correspondingly, when determining that the terminal is not reachable, the mobility management network element sends, to the visited policy control function network element, the notification indicating that the first message fails to be forwarded, where the notification includes the first identifier. The visited policy control function network element determines, based on the first identifier, the first PTI corresponding to the first policy.

The second request message or the second response message may be a message sent through a service-oriented interface (for example, an N-pcf interface) or a non-service-oriented interface (for example, N15). For example, the second request message is a Namf_Commmuncation_N1N2MessageTransfer Request. For another example, the second response message is a Namf_Commmuncation_N1N2MessageTransfer Response.

Optionally, the first message includes a second PTI, and the second PTI is allocated by the visited policy control function network element to the first policy. Correspondingly, that the visited policy control function network element determines, based on the first identifier, the first PTI corresponding to the first policy includes: The visited policy control function network element determines, based on the first identifier, the second PTI corresponding to the first policy; and the visited policy control function network element determines the first PTI based on the second PTI, where the first PTI corresponds to one or more PTIs, and the second PTI is a PTI in the one or more PTIs.

Herein, a difference from the first implementation lies in that the visited policy control function network element determines, based on the first identifier included in the notification, the second PTI corresponding to the first policy. Then, the visited policy control function network element determines the first PTI based on the second PTI. For a manner in which the visited policy control function network element determines the first PTI based on the second PTI, refer to the description in the first implementation. For brevity, details are not described herein again.

Herein, how the visited policy control function network element determines the second PTI based on the first identifier is described. Optionally, after the visited policy control function network element receives the second response message from the mobility management network element, the method 600 further includes: The visited policy control function network element stores a second correspondence between the first identifier and the second PTI. Correspondingly, that the visited policy control function network element determines, based on the first identifier, the second PTI corresponding to the first policy includes: The visited policy control function network element determines the second PTI based on the second correspondence and the first identifier.

Specifically, after receiving the second response message from the mobility management network element, where the second response message includes the first identifier, the visited policy control function network element temporarily cannot determine whether the first policy is successfully forwarded, and may first store the second correspondence between the first identifier and the second PTI. Then, after receiving, from the mobility management network element, the notification indicating that the first message fails to be forwarded, the visited policy control function network element may determine that the first policy fails to be forwarded. The visited policy control function network element may obtain the second PTI based on the second correspondence and the first identifier included in the notification.

Alternatively, after the visited policy control function network element receives the second response message from the mobility management network element, the method 600 further includes: The visited policy control function network element stores a first correspondence between the first identifier and the first PTI. Correspondingly, that the visited policy control function network element determines, based on the first identifier, the first PTI corresponding to the first policy includes: The visited policy control function network element determines the first PTI based on the first correspondence and the first identifier.

Specifically, after receiving the second response message from the mobility management network element, where the second response message includes the first identifier, the visited policy control function network element temporarily cannot determine whether the first policy is successfully forwarded, and may first store the first correspondence between the first identifier and the first PTI. Then, after receiving, from the mobility management network element, the notification indicating that the first message fails to be forwarded, the visited policy control function network element may determine that the first policy fails to be forwarded. The visited policy control function network element may directly obtain the first PTI based on the first correspondence between the first identifier and the first PTI and the first identifier included in the notification.

If there are a plurality of messages that fail to be sent, the mobility management network element may return a plurality of notifications to the visited policy control function network element, and each notification carries an identifier corresponding to a message that fails to be sent. For example, if the first message fails to be forwarded, the notification indicating that the first message fails to be forwarded carries the first identifier. Alternatively, for the plurality of messages that fail to be sent, the mobility management network element may return only one notification, and the notification carries an identifier list. Optionally, the notification may include the identifier list, the identifier list includes a plurality of identifiers, each identifier is used to identify a message that fails to be sent, and the first identifier is one of the plurality of identifiers.

Figure 8:
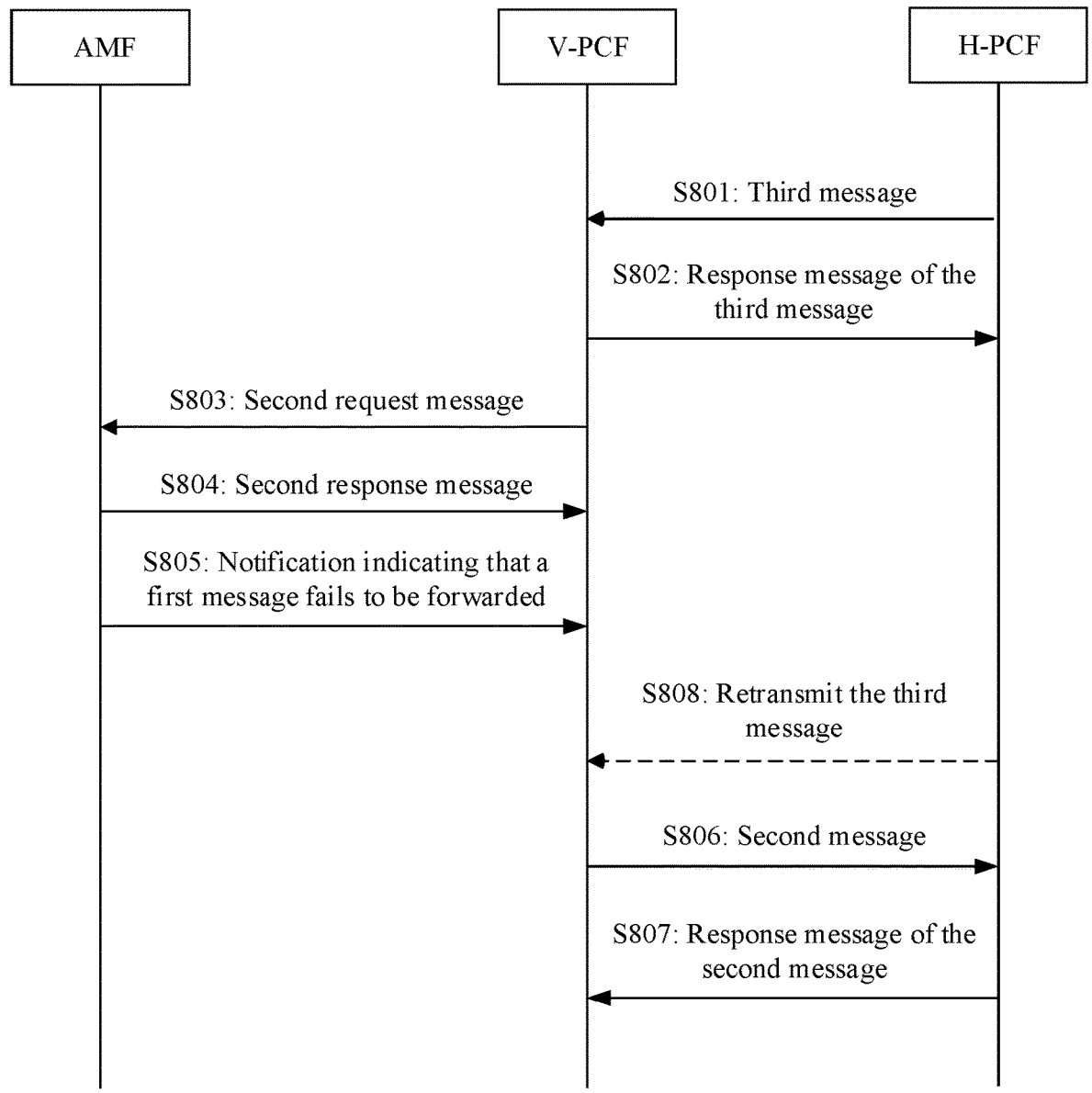
FIG. 8 is a schematic interaction diagram of another example of sending a terminal policy according to an embodiment of this application.

For ease of understanding, description is provided herein with reference to an example in FIG. 8. FIG. 8 is described by using an example in which the home policy control function network element is an H-PCF, the visited policy control function network element is a V-PCF, and the mobility management network element is an AMF. As shown in FIG. 8, the method includes the following steps.

S801: The H-PCF sends a third message to the V-PCF.

For a specific description of S801, refer to the description of S701. Details are not described herein again.

S802: The V-PCF sends a response message of the third message to the H-PCF.

For example, the response message of the third message is an Npcf_UEPolicyControl_UpdateNotify Response.

S803: The V-PCF sends a second request message to the AMF. The second request message is used to request to forward a first message.

For example, the second request message is an Namf_Commmuncation_N1N2MessageTransfer Request, and the first message is a MANAGE UE POLICY COMMAND.

The V-PCF allocates a PTI 2 to a UE policy, replaces a PTI 1 in the MANAGE UE POLICY COMMAND with the PTI 2, and then sends the MANAGE UE POLICY COMMAND to the AMF through the Namf_Commmuncation_N1N2MessageTransfer Request.

The V-PCF may store a correspondence between the PTI 1 and the PTI 2.

Herein, if a size of the UE policy exceeds a size predefined by a VPLMN, the V-PCF encapsulates the UE policy provided by the H-PCF into a plurality of MANAGE UE POLICY COMMANDs, and sends the plurality of MANAGE UE POLICY COMMANDs to the AMF through a plurality of Namf_Commmuncation_N1N2MessageTransfer Requests.

For example, if the V-PCF sends, by encapsulating two MANAGE UE POLICY COMMANDs, the UE policy provided by the H-PCF, the V-PCF may allocate the PTI 2 and a PTI 3 to the two MANAGE UE POLICY COMMANDs. Each MANAGE UE POLICY COMMAND is sent to the AMF through one Namf_Commmuncation_N1N2MessageTransfer Request.

In other words, a first policy of a terminal may be encapsulated into one MANAGE UE POLICY COMMAND and sent to the AMF through one Namf_Commmuncation_N1N2MessageTransfer Request.

S804: The AMF sends a second response message to the V-PCF, where the second response message includes a first identifier.

For example, the second response message may be an Namf_Commmuncation_N1N2MessageTransfer Response, and the first identifier is a transfer Id. Specifically, the first identifier is a resource URI for storing an N1/N2 message forwarding state, for example, apiRoot/namf-comm/v1/ue-contexts/{ueContextId}/n1-n2-messages/{n1N2MessageId}.

Optionally, if the AMF receives the plurality of Namf_Commmuncation_N1N2MessageTransfer Requests, the AMF may return a plurality of Namf_Commmuncation_N1N2MessageTransfer Responses, and each Namf_Commmuncation_N1N2MessageTransfer Request includes one transfer Id.

Optionally, after receiving the Namf_Commmuncation_N1N2MessageTransfer Response, the V-CPF may store a correspondence between the transfer Id and the PTI 2, and/or a correspondence between the transfer Id and the PTI 1, to subsequently determine the PTI 2 and/or the PTI 1 based on the transfer Id.

5805: The AMF returns, to the V-PCF, a notification indicating that the first message fails to be forwarded. The notification includes the first identifier.

If determining that the UE is not reachable, the AMF sends, to the V-PCF, the notification indicating that the first message fails to be forwarded. For example, the notification may be an Namf_Commmuncation_N1N2TransferFail-ureNotification.

If the plurality of Namf_Commmuncation_N1N2MessageTransfer Requests received by the AMF cannot be forwarded to the terminal, the AMF may send a plurality of Namf_Commmuncation_N1N2TransferFailureNotifications to the V-PCF, where each Namf_Commmuncation_N1N2-TransferFailureNotification carries a corresponding transfer Id. Alternatively, the AMF sends only one Namf_Commmuncation_N1N2TransferFailureNotification to the V-PCF, where the Namf_Commmuncation_N1N2TransferFailureNotification carries a list, and the list includes transfer Ids corresponding to a plurality of messages that fail to be forwarded.

The V-PCF may learn, based on the transfer Id in the Namf_Commmuncation_N1N2TransferFailureNotification and the correspondence between the transfer Id and the PTI 2, that a policy in a MANAGE UE POLICY COMMAND corresponding to the PTI 2 fails to be forwarded. Because the correspondence between the PTI 2 and the PTI 1 is further stored in S803, the V-PCF may learn of the corresponding PTI 1. Alternatively, if the correspondence between the transfer Id and the PTI 1 is stored in S804, the V-PCF may directly determine the PTI 1 based on the transfer Id and the correspondence between the transfer Id and the PTI 1.

Optionally, if in S803, the V-PCF allocates a plurality of PTIs, for example, the PTI 2 and the PTI 3, to the PTI 1, and in the plurality of PTIs, some messages are forwarded successfully (in other words, the V-PCF receives only transfer Ids corresponding to some PTIs). For example, if the V-PCF receives only a transfer Id corresponding to the PTI 2 but does not receive a transfer Id corresponding to the PTI 3, it may be considered that a UE policy corresponding to the PTI 3 is successfully sent. The V-PCF may further determine a UPSI list in the UE policy based on the PTI 2.

S806: The V-PCF sends a second message to the H-PCF.

For example, the second message is an Npcf_UEPolicyUpdate_Request, and the Npcf_UEPolicyUpdate_Request includes a failure indication and the PTI 1.

Optionally, if a part of the UE policy corresponding to the PTI 1 fails to be sent, the V-PCF may include, in the second message, a UPSI list corresponding to a failed UE policy.

S807: The H-PCF returns a response message of the second message to the V-PCF.

For example, the response message of the second message is an Npcf_UEPolicyControl_UpdateNofiy Response. The H-PCF may stop a timer corresponding to the PTI 1, and sends the UE policy only after the UE is reachable.

Therefore, in the second implementation, the visited policy control function network element may determine, based on the first identifier in the notification indicating that the first message fails to be forwarded, the second PTI corresponding to the first policy, and then determine the first PTI based on the second PTI, or may directly determine the first PTI.

It should be understood that the examples in FIG. 7 and FIG. 8 are provided merely for helping a person skilled in the art understand the embodiments of this application, instead of limiting the embodiments of this application to specific scenarios shown in the examples. A person skilled in the art can clearly make various equivalent modifications or changes according to the examples in FIG. 7 and FIG. 8, and such modifications or changes also fall within the scope of the embodiments of this application.

In this embodiment of this application, the second message may alternatively be sent by the visited policy control function network element when the visited policy control function network element receives the first policy retransmitted by the home policy control function network element. Optionally, S620 includes: When receiving the first policy retransmitted by the home policy control function network element, the visited policy control function network element sends the second message to the home policy control function network element. To be specific, when the visited policy control function network element receives the first policy retransmitted by the home policy control function network element, if the terminal is still not reachable (for example, the mobility management network element does not send a terminal reachability indication), the visited policy control function network element may send the second message to the home policy control function network element.

When sending the third message to the visited policy control function network element, the home policy control function network element may start a timer, for example, a first timer. After the first timer expires, the home policy control function network element may re-send the third message to the visited policy control function network element. After the first timer expires, if the home policy control function network element does not receive a response message from the visited policy control function network element, the home policy control function network element retransmits the third message to the visited policy control function network element.

It should be understood that the procedure in FIG. 7 or FIG. 8 is applicable to a scenario in which the visited policy control function network element receives the first policy retransmitted by the home policy control function network element. The example in FIG. 8 is used. Optionally, before S806, the method further includes S808: The H-PCF re-sends the third message to the V-PCF. Herein, if the H-PCF does not receive a response message from the V-PCF after the timer started in S801 expires, the H-PCF re-sends the third message to the V-PCF. Correspondingly, the second message in S806 is sent by the V-PCF after the V-PCF receives the third message retransmitted by the H-PCF.

In the foregoing implementations, after detecting that the terminal is reachable, the mobility management network element may notify the visited policy control function network element that the terminal is reachable. The visited policy control function network element may notify the home policy control function network element that the terminal is reachable. In this way, after learning that the terminal is reachable, the home policy control function network element may continue to provide the terminal policy. The following provides detailed descriptions with reference to an interaction diagram in FIG. 9. It should be understood that the procedure in FIG. 9 may be used in combination with the foregoing implementation (in FIG. 6, FIG. 7, or FIG. 8), or may be used independently. This is not limited in the embodiments of this application.

Figure 9:
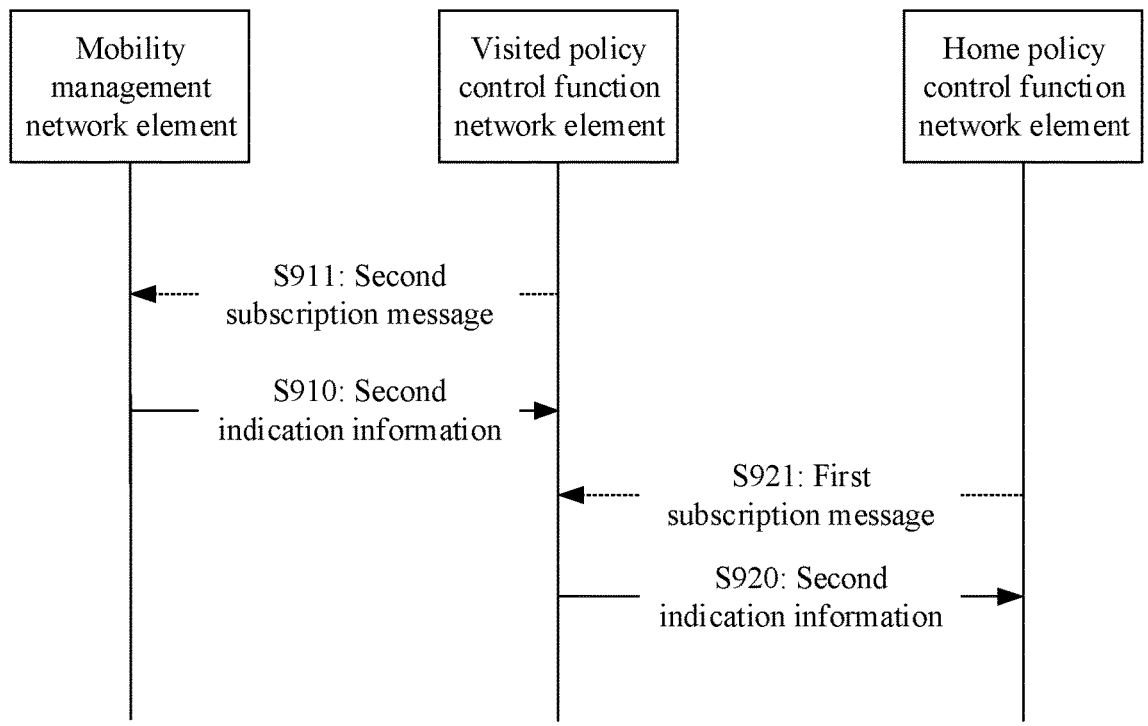
FIG. 9 is another schematic flowchart of a method for sending a terminal policy according to an embodiment of this application.

FIG. 9 is another schematic interaction diagram of a method 900 for sending a terminal policy according to an embodiment of this application. As shown in FIG. 9, the method 900 includes the following steps.

S910: A mobility management network element sends second indication information to a visited policy control function network element, where the second indication information is used to indicate that the terminal is reachable. Correspondingly, the visited policy control function network element receives the second indication information from the mobility management network element.

Herein, the mobility management network element may detect a terminal to which a message fails to be forwarded. After detecting that the terminal is reachable, the mobility management network element may send a reachability indication, for example, the second indication information, to the visited policy control function network element. For example, the second indication information is sent through an Namf_EventExposure message.

Optionally, before S910, the method 900 further includes S911: The visited policy control function network element sends a second subscription message to the mobility management network element, where the second subscription message is used to subscribe to an event that the terminal is reachable. Correspondingly, the mobility management network element receives the second subscription message from the visited policy control function network element.

To be specific, the mobility management network element may send the second indication information to the visited policy control function network element depending on that the visited policy control function network element subscribes to the event that the terminal is reachable.

Alternatively, the mobility management network element may send the second indication information to the visited policy control function network element depending on that a notification indicating that a message fails to be forwarded has been sent to the visited policy control function network element.

S920: The visited policy control function network element sends the second indication information to a home policy control function network element. Correspondingly, the home policy control function network element receives the second indication information from the visited policy control function network element.

For example, the second indication information is sent through an Npcf_UEPolicyControl_Update Request message. Optionally, after receiving the Npcf_UEPolicyControl_Update Request, the home policy control function network element may return an Npcf_UEPolicyControl_Update Response to the visited policy control function network element.

Therefore, after detecting that the terminal is reachable, the mobility management network element sends a reachability indication to the visited policy control function network element. The visited policy control function network element may send the reachability indication to the home policy control function network element, so that the home policy control function network element continues to send a terminal policy.

Optionally, before S920, the method 900 further includes S921: The home policy control function network element sends a first subscription message to the visited policy control function network element, where the first subscription message is used to subscribe to an event that the terminal is reachable. Correspondingly, the visited policy control function network element receives the first subscription message from the home policy control function network element.

To be specific, the visited policy control function network element may send the second indication information to the home policy control function network element depending on that the home policy control function network element subscribes to the event that the terminal is reachable.

Alternatively, the visited policy control function network element may send the second indication information to the home policy control function network element depending on that a failure indication (for example, the second message in the method 600) has been sent to the home policy control function network element.

In this embodiment of this application, when determining that the terminal is reachable, the mobility management network element may notify the visited policy control function network element. When learning that the terminal is reachable, the visited policy control function network element sends the reachability indication to the home policy control function network element, so that the home policy control function network element can continue to provide the terminal policy.

It should be understood that the solutions in the embodiments of this application may be used in combination, or may be used independently, and explanations or descriptions of the terms in the embodiments may be cross-referenced or explained in the embodiments. This is not limited.

The foregoing describes the method for sending a terminal policy according to the embodiments of this application. The following describes an apparatus according to the embodiments of this application. It should be understood that the technical features described in the method embodiments are also applicable to the following apparatus embodiment.

Figure 10:
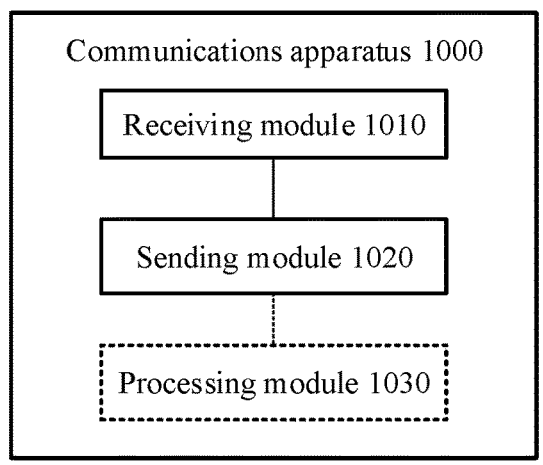
FIG. 10 is a schematic block diagram of a communications apparatus according to an embodiment of this application.

FIG. 10 is a schematic block diagram of a communications apparatus 1000 according to an embodiment of this application. Optionally, a specific form of the communications apparatus 1000 may be a general-purpose computer device or a chip in a general-purpose computer device. This is not limited in this embodiment of this application. The communications apparatus 1000 includes a receiving module 1010 and a sending module 1020. Optionally, the communications apparatus 1000 may further include a processing module 1030.

Specifically, the communications apparatus 1000 may be any network element in this application, and may implement a function that can be implemented by the network element. It should be understood that the communications apparatus 1000 may be a physical device, or may be a component (for example, an integrated circuit or a chip) in a physical device, or may be a function module in a physical device.

For example, the communications apparatus 1000 may be configured to implement a function of a visited policy control function network element described in this specification. For example, the communications apparatus 1000 may be a visited policy control function network element, or may be a component (for example, an integrated circuit or a chip) in a visited policy control function network element, or may be a function module.

In an implementation, the receiving module 1010 is configured to receive, from a mobility management network element, a notification indicating that a first message fails to be forwarded, where the first message includes a first policy of a terminal.

The sending module 1020 is configured to send a second message to a home policy control function network element, where the second message includes first indication information and a first procedure transaction identity PTI, the first indication information is used to indicate that a terminal policy fails to be sent, and the first PTI is allocated by the home policy control function network element to the first policy.

Optionally, in a possible implementation, the sending module 1020 is further configured to send a first request message to the mobility management network element, where the first request message is used to request the mobility management network element to forward the first message. Correspondingly, that the receiving module 1010 is configured to receive, from the mobility management network element, the notification indicating that the first message fails to be forwarded specifically includes: receiving a first response message from the mobility management network element, where the notification is the first response message.

Optionally, the first message includes a second PTI, and the second PTI is allocated by the visited policy control function network element to the first policy. The apparatus 1000 further includes the processing module 1030, configured to: determine, based on the notification, the second PTI corresponding to the first policy; and determine the first PTI based on the second PTI, where the first PTI corresponds to one or more PTIs, and the second PTI is a PTI in the one or more PTIs.

Optionally, in another possible implementation, the sending module 1020 is further configured to send a second request message to the mobility management network element, where the second request message is used to request the mobility management network element to forward the first message. The receiving module 1010 is further configured to receive a second response message from the mobility management network element, where the second response message includes a first identifier, the first identifier is used to identify the first message, and correspondingly, the notification includes the first identifier. The processing module 1030 is configured to determine, based on the first identifier, the first PTI corresponding to the first policy.

Optionally, the processing module 1030 is further configured to store a first correspondence between the first identifier and the first PTI. Correspondingly, that the processing module 1030 is configured to determine, based on the first identifier, the first PTI corresponding to the first policy specifically includes: determining the first PTI based on the first correspondence and the first identifier.

Optionally, the first message includes a second PTI, and the second PTI is allocated by the visited policy control function network element to the first policy. Correspondingly, that the processing module 1030 is configured to determine, based on the first identifier, the first PTI corresponding to the first policy specifically includes: determining, based on the first identifier, the second PTI corresponding to the first policy; and determining the first PTI based on the second PTI, where the first PTI corresponds to one or more PTIs, and the second PTI is a PTI in the one or more PTIs.

Optionally, the processing module 1030 is further configured to store a second correspondence between the first identifier and the second PTI. Correspondingly, that the processing module 1030 is configured to determine, based on the first identifier, the second PTI corresponding to the first policy specifically includes: determining the second PTI based on the second correspondence and the first identifier.

Optionally, the notification further includes an identifier list, the identifier list includes a plurality of identifiers, each identifier is used to identify a message that fails to be sent, and the first identifier is one of the plurality of identifiers.

Optionally, the second message further includes a terminal policy section identifier of the first policy.

Optionally, that the sending module 1020 is configured to send the second message to the home policy control function network element specifically includes: when the first policy retransmitted by the home policy control function network element is received, sending the second message to the home policy control function network element.

Optionally, the receiving module 1010 is further configured to receive second indication information from the mobility management network element, where the second indication information is used to indicate that the terminal is reachable. The sending module 1020 is further configured to send the second indication information to the home policy control function network element.

Optionally, the receiving module 1010 is further configured to receive a first subscription message from the home policy control function network element, where the first subscription message is used to subscribe to an event that the terminal is reachable. Correspondingly, that the sending module 1020 is configured to send the second indication information to the home policy control function network element specifically includes: sending the second indication information to the home policy control function network element based on the first subscription message.

Optionally, the sending module 1020 is further configured to send a second subscription message to the mobility management network element, where the second subscription message is used to subscribe to an event that the terminal is reachable.

It should be understood that the communications apparatus 1000 according to this embodiment of this application may correspond to the method (for example, the methods in FIG. 6 to FIG. 9) of the visited policy control function network element in the foregoing method embodiments, and the foregoing and other management operations and/or functions of the modules in the communications apparatus 1000 are separately used to implement corresponding steps of the method of the visited policy control function network element in the foregoing method embodiments. Therefore, beneficial effects in the foregoing method embodiments can also be implemented. For brevity, details are not described herein again.

For another example, the communications apparatus 1000 may be configured to implement a function of a home policy control function network element described in this specification. For example, the communications apparatus 1000 may be a home policy control function network element, or may be a component (for example, an integrated circuit or a chip) in a home policy control function network element, or may be a function module.

The sending module 1020 is configured to send a third message to a visited policy control function network element, where the third message includes a first policy of a terminal and a first procedure transaction identity PTI, and the first PTI is allocated by the home policy control function network element to the first policy.

The receiving module 1010 is configured to receive a second message from the visited policy control function network element, where the second message includes first indication information and the first PTI, and the first indication information is used to indicate that a terminal policy fails to be sent.

Optionally, the processing module 1030 is configured to stop, based on the first PTI indication information, a timer corresponding to the first PTI, where the timer is used by the home policy control function network element to determine to send the first policy.

Optionally, the processing module 1030 is further configured to: start a first timer when the home policy control function network element sends the third message to the visited policy control function network element; and after the first timer expires, invoke the sending module 1020 to retransmit the third message to the visited policy control function network element if no response message is received from the visited policy control function network element. Correspondingly, that the receiving module 1010 is configured to receive the second message from the visited policy control function network element specifically includes: after the home policy control function network element retransmits the third message to the visited policy control function network element, receiving the second message from the visited policy control function network element.

Optionally, the second message further includes a terminal policy section identifier corresponding to the first policy.

Optionally, in a possible implementation, the receiving module 1010 is further configured to receive second indication information from the visited policy control function network element, where the second indication information is used to indicate that the terminal is reachable. The sending module 1020 is further configured to send a response message to the visited policy control function network element, where the response message is used to respond to the second indication information.

Optionally, the sending module 1020 is further configured to send a first subscription message to the visited policy control function network element, where the first subscription message is used to subscribe to an event that the terminal is reachable.

It should be understood that the communications apparatus 1000 according to this embodiment of this application may correspond to the method (for example, the methods in FIG. 6 to FIG. 9) of the home policy control function network element in the foregoing method embodiments, and the foregoing and other management operations and/or functions of the modules in the communications apparatus 1000 are separately used to implement corresponding steps of the method of the home policy control function network element in the foregoing method embodiments. Therefore, beneficial effects in the foregoing method embodiments can also be implemented. For brevity, details are not described herein again.

It should further be understood that in this embodiment, the communications apparatus 1000 is presented in a form of function modules. The "module" herein may be an application-specific integrated circuit ASIC, a circuit, a processor and a memory that execute one or more software or firmware programs, an integrated logical circuit, and/or another component that can provide the foregoing function. In a simple embodiment, a person skilled in the art may figure out that the apparatus 1000 may be in a form shown in FIG. 5. The processing module 1030 may be implemented by the processor 501 shown in FIG. 5. Optionally, if the computer device shown in FIG. 5 includes the memory 502, the processing module 1030 may be implemented by the processor 501 and the memory 502. The receiving module 1010 and the sending module 1020 may be implemented by the transceiver 503 shown in FIG. 5. The transceiver 503 includes a receiving function and a sending function. Specifically, the processor executes a computer program stored in the memory to implement a function of the processor. Optionally, when the apparatus 1000 is a chip, functions and/or implementation processes of the receiving module 1010 and the sending module 1020 may alternatively be implemented by a pin, a circuit, or the like. Optionally, the memory may be a storage unit in the chip, such as a register or a cache. The storage unit may alternatively be a storage unit that is in the computer device and that is located outside the chip, for example, the memory 502 shown in FIG. 5, or may be a storage unit that is deployed in another system or device but not located in the computer device. A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) and a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

This application further provides a computer-readable medium. The computer-readable medium stores a computer program. When the computer program is executed by a computer, the function in any one of the foregoing method embodiments is implemented.

This application further provides a computer program product. When the computer program product is executed by a computer, the function in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

It should be understood that "an embodiment" mentioned in the whole specification means that particular features, structures, or characteristics related to the embodiment are included in at least one embodiment of this application. Therefore, the embodiments in the entire specification do not necessarily refer to a same embodiment. In addition, these particular features, structures, or characteristics may be combined in one or more embodiments in any appropriate manner.

It should be understood that in the embodiments of the present invention, numbers "first", "second", and the like are merely used to distinguish between different objects, for example, to distinguish between different messages or different indication information, and do not constitute a limitation on the scope of the embodiments of this application. The embodiments of this application are not limited thereto.

It should further be understood that in this application, "when", "if" and "if" mean that the network element performs corresponding processing in an objective situation, are not intended to limit time, do not require the network element to have a determining action during implementation, and do not mean any other limitation.

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

It should further be understood that sequence numbers of the foregoing processes do not mean execution sequences in various embodiments of this application, and the execution sequences of the processes should be determined based on functions and internal logic of the processes. Numerical symbols or sequence numbers in the foregoing processes are differentiated merely for ease of description, and should not constitute any limitation on the implementation processes in the embodiments of this application.

It should further be understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

Unless otherwise stated, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional case of the item. When the expression is "the item includes at least one of the following: A, B, . . . , and X", in other words, more elements are included in the expression, a case to which the item is applicable may also be obtained according to the foregoing rule.

It should be understood that in the embodiments of this application, "B corresponding to A" indicates that B is associated with A, and B may be determined based on A. However, it should further be understood that determining B based on A does not mean that B is determined based on A only; to be specific, B may also be determined based on A and/or other information.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electrical, mechanical, or other forms.

The units described as separate parts may or may not be physically separate, and parts displayed as units may or may not be physical units, may be located at one position, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a terminal policy, comprising:
sending, by a visited policy control function network element, a second request message to a mobility management network element, wherein the second request message is used to request the mobility management network element to forward a first message, wherein the first message comprises a first policy of a terminal;
receiving, by the mobility management network element, the second request message;
sending, by the mobility management network element, a second response message to the visited policy control function network element, wherein the second response message comprises a first identifier, the first identifier is used to identify the first message;

receiving, by the visited policy control function network element, the second response message;

determining, by the visited policy control function network element based on the first identifier, a first procedure transaction identity (PTI) corresponding to the first policy;

receiving, by the visited policy control function network element from the mobility management network element, a notification indicating that the first message fails to be forwarded; and sending, by the visited policy control function network element, a second message to a home policy control function network element, wherein the second message comprises first indication information and the first PTI, the first indication information indicates that a terminal policy fails to be sent.

2. The method according to claim 1, wherein the first message comprises a second PTI, and the second PTI is allocated by the visited policy control function network element to the first policy; and the method further comprises:

determining, by the visited policy control function network element based on the notification, the second PTI corresponding to the first policy; and determining, by the visited policy control function network element, the first PTI based on the second PTI, wherein the first PTI corresponds to one or more PTIs, and the second PTI is one of the one or more PTIs.

3. The method according to claim 1, wherein after the receiving, by the visited policy control function network element, the second response message from the mobility management network element, the method further comprises:

storing, by the visited policy control function network element, a first correspondence between the first identifier and the first PTI; and correspondingly, the determining, by the visited policy control function network element based on the first identifier, the first PTI corresponding to the first policy comprises:

determining, by the visited policy control function network element, the first PTI based on the first correspondence and the first identifier.

4. The method according to claim 1, wherein the first message comprises a second PTI, and the second PTI is allocated by the visited policy control function network element to the first policy; and correspondingly, the determining, by the visited policy control function network element based on the first identifier, the first PTI corresponding to the first policy comprises: determining, by the visited policy control function network element based on the first identifier, the second PTI corresponding to the first policy; and determining, by the visited policy control function network element, the first PTI based on the second PTI, wherein the first PTI corresponds to one or more PTIs, and the second PTI is one of the one or more PTIs.

5. The method according to claim 4, wherein after the receiving, by the visited policy control function network element, the second response message from the mobility management network element, the method further comprises:

storing, by the visited policy control function network element, a first correspondence between the first identifier and the first PTI; and correspondingly, the determining, by the visited policy control function network element based on the first identifier, the first PTI corresponding to the first policy comprises:

determining, by the visited policy control function network element, the first PTI based on the first correspondence and the first identifier.

6. The method according to claim 1, wherein the method further comprises:

determining, by the mobility management network element, that the first message fails to be forwarded; and sending, by the mobility management network element to the visited policy control function network element, the notification.

7. The method according to claim 1, wherein the method further comprises:

receiving, by the visited policy control function network element, second indication information from the mobility management network element, wherein the second indication information indicates that the terminal is reachable; and sending, by the visited policy control function network element, the second indication information to the home policy control function network element.

8. The method according to claim 1, wherein the first PTI is allocated by the home policy control function network element to the first policy.

9. A system for sending a terminal policy, comprising:
a visited policy control function network element; and
a mobility management network element, wherein:
the visited policy control function network element is configured to:
send a second request message to the mobility management network element, wherein the second request message is used to request the mobility management network element to forward a first message, wherein the first message comprises a first policy of a terminal;

the mobility management network element is configured to:
receive the second request message;
send a second response message to the visited policy control function network element, wherein the second response message comprises a first identifier, the first identifier is used to identify the first message; and the visited policy control function network element is further configured to:
receive, from the mobility management network element, the second response message;
determine, based on the first identifier, a first procedure transaction identity (PTI) corresponding to the first policy;
receive, from the mobility management network element, a notification indicating that the first message fails to be forwarded;
send a second message to a home policy control function network element, wherein the second message comprises first indication information and the first PTI, the first indication information indicates that a terminal policy fails to be sent.

10. The system according to claim 9, wherein the first message comprises a second PTI, and the second PTI is allocated by the visited policy control function network element to the first policy; and wherein the visited policy control function network element is configured to:

determine, based on the first identifier, the second PTI corresponding to the first policy; and determine the first PTI based on the second PTI, wherein the first PTI corresponds to one or more PTIs, and the second PTI is one of the one or more PTIs.

11. The system according to claim 9, wherein the first PTI is allocated by the home policy control function network element to the first policy.

12. An apparatus for sending a terminal policy, comprising:

at least one processor; and one or more memories coupled to the at least one processor and configured to store instructions for execution by the at least one processor such that when executed, cause the apparatus to:

send a second request message to a mobility management network element, wherein the second request message is used to request the mobility management network element to forward a first message, wherein the first message comprises a first policy of a terminal;

receive, from the mobility management network element, a second response message, wherein the second response message comprises a first identifier, the first identifier is used to identify the first message;

determine, based on the first identifier, a first procedure transaction identity (PTI) corresponding to the first policy;

receive, from the mobility management network element, a notification indicating that the first message fails to be forwarded; and send a second message to a home policy control function network element, wherein the second message comprises first indication information and the first PTI, the first indication information indicates that a terminal policy fails to be sent.

13. The apparatus according to claim 12, wherein the first message comprises a second PTI, and the second PTI is allocated by the apparatus to the first policy; and wherein the at least one processor is configured to execute the instructions to cause the apparatus to:

determine, based on the notification, the second PTI corresponding to the first policy; and determine the first PTI based on the second PTI, wherein the first PTI corresponds to one or more PTIs, and the second PTI is one of the one or more PTIs.

14. The apparatus according to claim 12, wherein the at least one processor is configured to execute the instructions to cause the apparatus to:

store a first correspondence between the first identifier and the first PTI; and determining the first PTI based on the first correspondence and the first identifier.

15. The apparatus according to claim 12, wherein the at least one processor is configured to execute the instructions to cause the apparatus to:

receive second indication information from the mobility management network element, wherein the second indication information indicates that the terminal is reachable; and send the second indication information to the home policy control function network element.

16. The apparatus according to claim 12, wherein the first PTI is allocated by the home policy control function network element to the first policy.

17. A method for sending a terminal policy, comprising:

sending, by a visited policy control function network element, a second request message to a mobility management network element, wherein the second request message is used to request the mobility management network element to forward a first message, wherein the first message comprises a first policy of a terminal;

receiving, by the visited policy control function network element from the mobility management network element, a second response message, wherein the second response message comprises a first identifier, the first identifier is used to identify the first message;

determining, by the visited policy control function network element based on the first identifier, a first procedure transaction identity (PTI) corresponding to the first policy;

receiving, by the visited policy control function network element from the mobility management network element, a notification indicating that the first message fails to be forwarded; and send a second message to a home policy control function network element, wherein the second message comprises first indication information and the first PTI, the first indication information indicates that a terminal policy fails to be sent.

18. The method according to claim 17, wherein the first message comprises a second PTI, and the second PTI is allocated by the visited policy control function network element to the first policy;

wherein the method further comprises:

determining, by the visited policy control function network element based on the notification, the second PTI corresponding to the first policy; and determining, by the visited policy control function network element, the first PTI based on the second PTI, wherein the first PTI corresponds to one or more PTIs, and the second PTI is one of the one or more PTIs.

19. The method according to claim 17, wherein the method further comprises:

storing, by the visited policy control function network element, a first correspondence between the first identifier and the first PTI; and determining, by the visited policy control function network element, the first PTI based on the first correspondence and the first identifier.

20. The method according to claim 17, wherein the method further comprises:

receiving, by the visited policy control function network element, second indication information from the mobility management network element, wherein the second indication information indicates that the terminal is reachable; and sending, by the visited policy control function network element, the second indication information to the home policy control function network element.

21. The method according to claim 18, wherein the first PTI is allocated by the home policy control function network element to the first policy.

* * * * *

UNITED STATES PATENT AND TRADEMARK OFFICE
CERTIFICATE OF CORRECTION

PATENT NO. : 11,564,080 B2
APPLICATION NO. : 17/158515
DATED : January 24, 2023
INVENTOR(S) : Xiaoyun Zhou Page 1 of 1

It is certified that error appears in the above-identified patent and that said Letters Patent is hereby corrected as shown below:

In the Claims

In Column 37, Line 66, in Claim 5, delete "first" and insert -- second --.

In Column 37, Line 67, in Claim 5, delete "first" and insert -- second --.

In Column 38, Line 3, in Claim 5, delete "first" and insert -- second --.

In Column 38, Line 6, in Claim 5, delete "first" and insert -- second --.

In Column 38, Line 6, in Claim 5, delete "first" and insert -- second --.

Signed and Sealed this
Twenty-fifth Day of April, 2023

Katherine Kelly Vidal
*Director of the United States Patent and Trademark Office*